(12) United States Patent
Kioka

(10) Patent No.: US 10,751,960 B2
(45) Date of Patent: Aug. 25, 2020

(54) DIE-CUTTING DEVICE FOR DIE-CUTTING FIBER MAT TO BE USED FOR PLASTIC GEAR, METHOD FOR PRODUCING GEAR-SHAPED CUTTER TO BE USED FOR THIS DIE-CUTTING DEVICE, METHOD FOR PRODUCING CUTTING TOOL, AND METHOD FOR DIE-CUTTING FIBER MAT

(71) Applicant: Tatsuru Kioka, Higashikagawa (JP)

(72) Inventor: Tatsuru Kioka, Higashikagawa (JP)

( * ) Notice: Subject to any disclaimer, the term of this patent is extended or adjusted under 35 U.S.C. 154(b) by 259 days.

(21) Appl. No.: 15/723,823

(22) Filed: Oct. 3, 2017

(65) Prior Publication Data

US 2018/0099464 A1    Apr. 12, 2018

(30) Foreign Application Priority Data

Oct. 11, 2016 (JP) ................................. 2016-200006
Feb. 16, 2017 (JP) ................................. 2017-027382

(51) Int. Cl.
*B23F 17/00* (2006.01)
*B29C 70/82* (2006.01)
*B29C 70/18* (2006.01)

(52) U.S. Cl.
CPC .............. *B29C 70/82* (2013.01); *B23F 17/00* (2013.01); *B29C 70/18* (2013.01)

(58) Field of Classification Search
CPC ......... B29C 70/82; B29C 70/18; B23F 17/00; B23F 21/22; B23F 9/10; B23F 19/005; B23F 9/105
See application file for complete search history.

(56) References Cited

FOREIGN PATENT DOCUMENTS

| JP | 6-114863 | 4/1994 |
|---|---|---|
| JP | 2009-97700 | 5/2009 |

*Primary Examiner* — Lee A Holly
(74) *Attorney, Agent, or Firm* — Wenderoth, Lind & Ponack, L.L.P.

(57) ABSTRACT

A cutting tool includes a steel gear-shaped cutter which has cutting edges for die-cutting a fiber mat into a predetermined gear shape. The cutting edges include tooth-top, tooth-bottom and tooth-surface cutting edges, and. The cutter has an inclined cylindrical exterior shape so that its thickness gradually increases from the cutting edges toward the base end. V-shaped grooves are formed on the exterior surface and become shallower from the cutting edge toward the base end. The wedge angle ($\alpha 1$) of the tooth-bottom line from the tooth-bottom cutting edge to the base end is greater than the wedge angle ($\alpha 2$) of the tooth-top cutting edge surface from the tooth-top cutting edges to the base end. The thickness (W1) of the tooth-bottom cutting edge is greater than the thickness (W2) of the tooth-top cutting edge on the base-side end.

11 Claims, 15 Drawing Sheets

DIE-CUTTING DEVICE FOR DIE-CUTTING FIBER MAT TO BE USED FOR PLASTIC GEAR, METHOD FOR PRODUCING GEAR-SHAPED CUTTER TO BE USED FOR THIS DIE-CUTTING DEVICE, METHOD FOR PRODUCING CUTTING TOOL, AND METHOD FOR DIE-CUTTING FIBER MAT

CROSS-REFERENCE TO RELATED APPLICATIONS

The present application claims priority under 35 U. S. C. § 119 to Japanese Patent Application No. 2016-200,006, filed on Oct. 11, 2016; and Japanese Patent Application No. 2017-027,382, filed on Feb. 16, 2017. The contents of this application are incorporated herein by reference in their entirety.

BACKGROUND OF THE INVENTION

1. Field of the Invention

The present invention relates to a cutting device for die-cutting organic or inorganic fiber mat into a gear exterior shape, the fiber mat having a predetermined thickness and being formed of distributed organic fibers (e.g., aramid fiber (aromatic polyamide fiber), polyimide fiber, PBO fiber, ultra-high-molecular-weight-polyethylene fiber, polyarylate fiber, carbon fiber, fluorine fiber and PPS fiber) or inorganic fibers (e.g., carbon fiber, silicon carbide fiber, alumina fiber, glass fiber and the metal fiber). The present invention also relates to methods for producing a cutter and a cutting tool which can be used in this cutting device, and a method for producing a fiber mat.

In this specification, the "fiber mat" is not limited to a mat having a predetermined thickness and being formed of randomly distributed fibers (including nonwoven fabric) but includes a mat constructed of a plurality of laminated nonwoven fabric sheets, or a plurality of laminated fiber cloth sheets which formed in any weaving manner, and a mat having a predetermined thickness and formed of a three-dimensional structure such as three-dimensional fibers which includes fibers extending in the thickness direction of a laminated fiber layers.

Also, the "fiber mat" is not limited to a mat which is composed only of a fiber structure but includes prepreg which is constructed of fibers impregnated with thermoplastic or thermosetting resin.

2. Description of the Related Art

Fiber-reinforced-plastic gears have been developed which are reinforced with fiber sheets. In one method for producing a plastic gear, the plastic gear is formed by cutting the outer peripheral surface of a cylindrical fiber reinforced plastic member into its gear shape after the cylindrical fiber reinforced plastic member is formed (Japanese Patent Laid-Open Publication No. JP 2009-97,700 A). In another method, the plastic gear is formed by die-cutting a laminated member which is prepreg constructed of continuous reinforcement glass fibers and thermoplastic resin (Japanese Patent Laid-Open Publication No. JP H06-114,863 A (1994).

The method which cuts the outer peripheral surface of the previously formed cylindrical member into the gear shape has a disadvantage that the production cost will be high since the volume to be cut is large in the cutting/grinding process. The method which die-cuts the prepreg into the gear shape has an advantage that the cutting/grinding process can be simple and plastic gears can be efficiently mass-manufactured.

In the production method disclosed in JP H06-114,863 A, a punch is used to die-cut a laminated plate of prepreg formed of thermoplastic resin and layers of continuous reinforcement glass fibers which are orientated at different angles (angled-fiber laminated plate) whereby forming the gear shape. The punch is guided into a through hole which is formed in a die, and die-cuts the angled-fiber laminated plate. In the case where punches are used for die-cutting, it is difficult to die-cut out a thick angled-fiber laminated plate. In particular, in the case where punches are used to die-cut an angled-fiber laminated plate which is formed of strong continuous reinforcement glass fibers such as carbon fibers, the stiff angled-fiber laminated plate cannot be efficiently die-cut. Particularly, punches cannot precisely die-cut the strong angled-fiber laminated plate into a small gear exterior shape. In addition, the outer peripheral edge of punches is susceptible to significant damage. Since punches cannot have sufficient durability when used to die-cut the stiff angled-fiber laminated plate, the running costs will be extremely high.

In order to overcome these disadvantages of punches, the present inventor has been produced a Thomson blade which is formed by folding a metal plate having a cutting edge into a gear shape. In order to die-cut a fiber sheet by using the Thomson blade, when the cutting edges of the Thomson blade are brought in contact with and pushed toward the fiber sheet which is placed on a flat workpiece rest, the Thomson blade can die-cut the fiber sheet if the fiber sheet is thin and formed of distributed cuttable fibers. However, if the fiber sheet is formed of strong fibers such as carbon and Kevlar fibers, the Thomson blade cannot die-cut the strong fiber sheets many times. In particular, the Thomson blade cannot cut a thick laminated fiber mat which is formed of a number of strong fiber layers. Specifically, the cutting edges of the Thomson blade cannot cut the strong fibers, and as a result the gear shape of the Thomson blade is altered due to deformation of the metal plate when the fiber mat is die-cut.

Since plastic gears are used instead of metal gears, the plastic gears necessarily have strength equal to the metal gears. In particular, for fiber-reinforced-plastic gears which transmit torque through small areas of gear tooth where gear teeth mesh each other, a very thick fiber mat is used which is formed of a number of strong fiber layers. For this reason, a die-cutting tool which die-cuts a fiber mat for fiber-reinforced-plastic gears is required to repeatedly die-cut such thick fiber laminated mats formed of strong fiber layers. Such characteristics required for this die-cutting tool are difficult to achieve.

The present invention is addressed to solve the difficult problem. It is an important object of the present invention to provide a cutting device which uses a cutting tool which can be produced at low cost but can efficiently and precisely die-cut even a thick fiber laminated mats formed of strong reinforcement fiber layers into a predetermined gear shape, and can repeatedly and precisely die-cut a large number of fiber mats into the predetermined gear shape whereby mass-manufacturing plastic gears at low cost, a method for producing a gear-shaped cutter which can be used in this cutting device, a method for producing a cutting tool which can be used in this cutting device, and a method for die-cutting a fiber mat.

SUMMARY OF THE INVENTION

A cutting device for die-cutting a fiber mat, which can be used for a fiber-reinforced-plastic gear, according to the present invention includes a workpiece rest 1, a cutting tool 3, and a cutting tool drive mechanism 5. A die-cutting surface 2 is provided on the upper surface side of the workpiece rest 1. A fiber mat 10 can be placed on the die-cutting surface 2 when being die-cut. The cutting tool 3 can be moved toward the die-cutting surface 2 of the workpiece rest 1 to die-cut the fiber mat 10 on the die-cutting surface 2. The cutting tool drive mechanism 5 moves the cutting tool 3 toward and away from the die-cutting surface 2.

The cutting tool 3 includes a cylindrical gear-shaped cutter 3A that is formed of steel (e.g., carbon steel and high-speed steel), and has cutting edges 4 on its tip end for die-cutting the fiber mat 10 into a predetermined gear shape. The cutting edges 4 of the gear-shaped cutter 3A lie in a plane parallel to the die-cutting surface 2 of the workpiece rest 1, and include tooth-top cutting edges 4A, tooth-bottom cutting edges 4B, and tooth-surface cutting edges 4C. The tooth-top cutting edges 4A can shape the addendum circle of the gear. The tooth-bottom cutting edge 4B can shape the bottom of the tooth space of the gear. The tooth-surface cutting edge 4C is arranged between the tooth-top cutting edges 4A and the tooth-bottom cutting edges 4B and can shape the tooth surfaces of the gear. The exterior shape of the gear-shaped cutter 3A is inclined in the movement direction. That is, the thickness of the gear-shaped cutter 3A gradually increases from the cutting edges 4 toward the base end of the gear-shaped cutter 3A. V-shaped grooves 16 are formed on the exterior surface of the gear-shaped cutter 3A from the cutting edges 4 toward the base end of the gear-shaped cutter 3A. The tip end edges of the V-shaped grooves 16 serve as the tooth-bottom cutting edges 4B and the tooth-surface cutting edges 4C. The depth of the V-shaped groove 16 gradually decreases from the cutting edges 4 toward the base end of the gear-shaped cutter 3A. The wedge angle ($\alpha 1$) of the tooth-bottom line 17 from the tooth-bottom cutting edge 4B to the base end of the gear-shaped cutter 3A is greater than the wedge angle ($\alpha 2$) from the tooth-top cutting edges 4A to the base end of the gear-shaped cutter 3A. The thickness (W1) of the base-side end of the tooth-bottom cutting edge 4B is greater than the thickness (W2) of the base-side end of the tooth-top cutting edge 4A.

According to the aforementioned cutting device for die-cutting a fiber mat, which can be used for a fiber-reinforced-plastic gear, by using a cutting tool which can be produced at low cost, the cutting device can efficiently and precisely die-cut even a thick fiber laminated mats formed of strong reinforcement fiber layers into a predetermined gear shape, and a large number of fiber mats can be repeatedly and precisely die-cut into predetermined gear-shaped sheets. As a result, plastic gears can be mass-manufactured at low cost from the die-cut gear-shaped sheets.

The cutting tool of the aforementioned cutting device includes a steel gear-shaped cutter 3A which has cutting edges 4 on its tip end for die-cutting a fiber mat 10 into a predetermined gear shape, and the cutting edges 4 of the gear-shaped cutter 3A include tooth-top cutting edges 4A for shaping the tops of the teeth of a gear and tooth-bottom cutting edges 4B for shaping the bottoms of the tooth spaces of the gear. In addition, the outside line 18 in section which extends from the tooth-top cutting edge 4A and the tooth-bottom cutting edge 4B toward the base end is inclined so that the outside line 18 on base end side is located outside relative to the cutting edge 4 side, that is, the thickness of the gear-shaped cutter 3A gradually increases from the cutting edge 4 toward the base end. The gear-shaped cutter 3A has V-shaped grooves 16 that extend from the cutting edges 4A toward the base end of the gear-shaped cutter 3A. The tip end edges of the V-shaped grooves 16 serve as the tooth-bottom cutting edges 4B and the tooth-surface cutting edges 4C. The depth of the V-shaped groove 16 gradually decreases from the cutting edges 4 toward the base end of the gear-shaped cutter 3A. The wedge angle ($\alpha 1$) of the tooth-bottom line 17 from the tooth-bottom cutting edge 4B to the base end of the gear-shaped cutter 3A is greater than the wedge angle ($\alpha 2$) from the tooth-top cutting edges 4A to the base end of the gear-shaped cutter 3A. The thickness (W1) of the base-side end of the tooth-bottom cutting edge 4B is greater than the thickness (W2) of the base-side end of the tooth-top cutting edge 4A. These features can achieve the above object.

In the aforementioned cutting tool, on the tip end of the gear-shaped cutter 3A formed of steel, the cutting edge 4 is provided which includes the tooth-bottom cutting edges 4B for shaping the bottoms of the tooth spaces of the gear, and the tooth-top cutting edges 4A for shaping the tops of the teeth of the gear. The thickness of the gear-shaped cutter 3A gradually increases from the cutting edges 4 as the tip end toward the base end of the gear-shaped cutter 3A. The tooth-bottom cutting edge 4B and the tooth-surface cutting edges 4C are arranged on the external surface of the gear-shaped cutter 3A, and serve as the tip ends of the V-shaped grooves 16. The depth of the V-shaped groove 16 gradually decreases from the cutting edges 4 as the tip end toward the base end of the gear-shaped cutter 3A. According to these features, the fiber mat 10 can be die-cut without deformation of the cutting edges 4. In particular, although the tooth-bottom cutting edge 4B, which locally protrudes inward from the gear-shaped cutter 3A, is likely to deform, the tooth-bottom cutting edge 4B can be reinforced by the aforementioned features. Accordingly, it can be ensured that the tooth-bottom cutting edge 4B is prevented from deforming due to the impact when die-cutting a fiber mat. In order to shape the bottom of the tooth space of a gear, the tooth-bottom cutting edge 4B locally protrudes inward, and is likely to deform due to impulsive force at the die-cutting process. In addition, as shown in a cross-sectional view of FIG. 6, since the tooth-bottom cutting edge 4B has a single-edged shape in order to guide the die-cut fiber mat 10, a stress shown by the arrow B is applied to the tooth-bottom cutting edge 4B at the die-cutting process. The reason is that the center line (A) between the both interior and exterior surfaces of the edge is inclined with respect to the movement direction of the cutting edge 4 of the gear-shaped cutter 3A. This stress applied to the tooth-bottom cutting edge 4B will cause deformation of the tooth-bottom cutting edge 4B after a number of die-cutting processes for die-cutting the fiber mat 10. If the tooth-bottom cutting edge 4B gradually deforms by the stress which is applied to the cutting edge 4, the cutting tool cannot precisely die-cut a number of fiber mats 10 into the gear shape.

Since the gear-shaped cutter of the aforementioned cutting tool has the aforementioned unique shape, deformation of the cutting edge 4 can be prevented even if impulsive force is applied at the die-cutting process. As a result, even thick strong fiber laminated mats which are hard to be die-cut by conventional cutting edges can be precisely die-cut into a predetermined gear shape, and in addition to this such thick strong fiber laminated mats can be repeatedly die-cut into a predetermined gear shape by the cutting tool of the cutting device according to the present invention.

In the cutting device for die-cutting a fiber mat, which can be used for a fiber-reinforced-plastic gear, according to the present invention, the size of a part of or the entire of the interior-side shape of the gear-shaped cutter 3A can gradually increase from tooth-top cutting edges 4 toward the base end of the gear-shaped cutter 3A. According to this die-cutting device, a gear-shaped sheet which is obtained by die-cutting a fiber mat can be smoothly guided along the interior surface of the gear-shaped cutter, and the gear-shaped sheet, which is guided along the interior surface, can be smoothly removed from the gear-shaped cutter.

In the cutting device for die-cutting a fiber mat, which can be used for a fiber-reinforced-plastic gear, according to the present invention, lengthwise grooves and protrusions can be formed which extend in the movement direction of the gear-shaped cutter and are alternately arranged on the interior surface of the gear-shaped cutter 3A, and the tooth-surface cutting edge 4A can be arranged between the lengthwise groove and the protrusions. The tooth-surface cutting edge 4C is arranged between the lengthwise groove and the protrusions. In addition, the tooth-bottom cutting edge 4B can be arranged on the tip end of the protrusion.

In the cutting device for die-cutting a fiber mat, which can be used for a fiber-reinforced-plastic gear, according to the present invention, the height of the protrusions of the gear-shaped cutter, which are arranged on the interior surface of the gear-shaped cutter 3A, can gradually decrease from the cutting edges 4 toward the base end of the gear-shaped cutter 3A.

In the cutting device for die-cutting a fiber mat, which can be used for a fiber-reinforced-plastic gear, according to the present invention, a cylindrical cutter can be provided on the interior side of gear-shaped cutter 3A, and form a through hole 12 in a gear-shaped sheet, and this cylindrical cutter can include sub-cutting edge 4 on its tip end. The sub-cutting 4 and the cutting edges 4 of the gear-shaped cutter 3A lie in the same plane. This die-cutting device can die-cut a fiber mat into a gear-shaped sheet which has a through hole.

In the cutting device for die-cutting a fiber mat, which can be used for a fiber-reinforced-plastic gear, according to the present invention, a metal base portion 3C which has a lower hardness than the gear-shaped cutter 3A can be fastened to the base end surface of the gear-shaped cutter 3A, and the metal base portion 3C can be coupled to the cutting tool drive mechanism whereby coupling the gear-shaped cutter 3A to the cutting tool drive mechanism. In this cutting tool, the metal base portion 3C can have a cylindrical shape, and can guide the die-cut gear-shaped sheet along the interior surface of the metal base portion 3C.

Also, a die-cutting device according to the present invention can be a device for die-cutting a fiber mat, which can be used for a fiber-reinforced-plastics helical-gear. The die-cutting device includes a workpiece rest 101, a cutting tool 103, and a cutting tool drive mechanism 105. A die-cutting surface 102 is provided on the upper surface side of the workpiece rest 101. The fiber mat 110 can be placed on the die-cutting surface 102 when being die-cut. The cutting tool 103 includes a gear-shaped cutter 103A, and can be moved toward the die-cutting surface 102 of the workpiece rest 101. Cutting edges 104 are formed on the tip end of the gear-shaped cutter 103A, and can die-cut the fiber mat 110 on the die-cutting surface 102 into a helical gear-shaped sheet 111. The cutting tool drive mechanism 105 moves the cutting tool 103 toward and away from the die-cutting surface 102. The gear-shaped cutter 103A includes cutting edges 104 that include tooth-top cutting edges 104A for shaping the addendum circle of the helical gear, tooth-bottom cutting edges 104B for shaping the bottoms of the tooth spaces of the helical gear, and tooth-surface cutting edges 104C for shaping the tooth surfaces of the helical gear. The tooth-surface cutting edges 104C are arranged the between tooth-top cutting edges 104A and the tooth-bottom cutting edges 104B. V-shaped grooves 116 are formed on the exterior surface of the gear-shaped cutter 103A from the tip end edge toward the base end of the gear-shaped cutter 103 and spaced at a predetermined interval away from each other, and the tip end edges of the V-shaped grooves 116 serve as the tooth-bottom cutting edges 104B and the tooth-surface cutting edges 104C, and lengthwise grooves 121 and protrusions 122 extend from the tip end toward the base end of the gear-shaped cutter 103A, and are alternately arranged on the interior surface of the gear-shaped cutter 103A and spaced at a predetermined interval away from each other. The tip end edge of the lengthwise grooves 121 serve as the tooth-top cutting edge 104A of the gear-shaped cutter 103A. The tip end edge between the lengthwise groove 121 and the protrusion 122 serves as the tooth-surface cutting edge 104C. The tip end edge of the protrusion 122 serves as the tooth-bottom cutting edge 104B. The protrusions 122 are arranged at the positions of the gear-shaped cutter 103A that are located on the interior side of the V-shaped grooves 116. The V-shaped grooves 116 and the protrusions 122 are inclined at a predetermined angle with respect to the center axis of the gear-shaped cutter 103A. The cutting tool drive mechanism 105 includes a rotation mechanism 105A that can rotate the cutting tool 103 about the center axis of the cutting tool 103 as the rotation axis when the fiber mat 110 on the workpiece rest 101 is die-cut. The fiber mat 110 on the workpiece rest 101 is die-cut while the cutting tool drive mechanism 105 rotates the cutting tool 103 whereby die-cutting the fiber mat 110 into a helical-gear-shaped sheet 111.

According to the aforementioned die-cutting device for die-cutting a fiber mat, which can be used for a fiber-reinforced-plastics helical-gear, by using a cutting tool which can be produced at low cost, the cutting device can efficiently and precisely die-cut even a thick fiber laminated mats formed of reinforcement fiber layers into a predetermined helical gear shape, a large number of fiber mats can be repeatedly and precisely die-cut into predetermined gear-shaped sheets.

In the aforementioned die-cutting device, the fiber mat 110 on the workpiece rest 101 is die-cut while the cutting tool drive mechanism 105 including the rolling mechanism 105A rotates the gear-shaped cutter 103A including the cutting edges 104 on its tip end which includes the tooth-top cutting edges 104A, the tooth-bottom cutting edges 104B and the tooth-surface cutting edge 104C for die-cutting the fiber mat 110 into a helical gear shape. The V-shaped grooves 116 are formed on the exterior surface of the gear-shaped cutter 103A from the tip end edge toward the base end of the gear-shaped cutter 103A and spaced at a predetermined interval away from each other, and the tip end edges of the V-shaped grooves 116 serve as the tooth-bottom cutting edges 104B and the tooth-surface cutting edges 104C. The lengthwise grooves 121 and protrusions 122 extend in the movement direction from the tip end toward the base end of the gear-shaped cutter 103A, and are alternately arranged on the interior surface of the gear-shaped cutter 103A and spaced at a predetermined interval away from each other. The tip end edge of the lengthwise grooves 121 serve as the tooth-top cutting edge 104A. The tip end edge between the lengthwise groove 121 and the protrusion 122 serves as the tooth-surface cutting edge 104C. The tip end edge of the protrusion 122 serves as the tooth-bottom cutting edge 104B. The protrusions 122 are arranged at the positions of the gear-shaped cutter 103A that are located on the interior side of the V-shaped grooves 116. The V-shaped grooves 116 and the protrusions 122 are inclined at a predetermined angle with respect to the center axis of the gear-shaped cutter 103A. Since the fiber mat 110 on the workpiece rest 101 is die-cut by the aforementioned cutting edge while the cutting tool drive mechanism 105 rotates the cutting tool 103A whereby die-cutting the fiber mat 110 into a helical-gear-shaped sheet 111, these features can achieve the above object.

The gear-shaped cutter 103A of the die-cutting device of the present invention can include a cutting-edge part 103a and a base part 103b. The cutting-edge part 103a includes cutting edges 104 on its tip end. The base part 103b is integrally coupled to the base-end side of the cutting-edge part 103a. The hardness of the base part 103b is smaller than the hardness of the cutting-edge part 103a. According to this gear-shaped cutter, since the base part, which has a lower hardness than the cutting-edge part, can absorb the impact at the die-cutting process, a fiber mat can be smoothly die-cut by this gear-shaped cutter. In this gear-shaped cutter 103A, the cutting-edge part 103a and the base part 103b can be formed of steel materials different from each other, and the cutting-edge part 103a and the base part 103b can be coupled to each other by welding.

In the die-cutting device of the present invention, the cutting tool 103 can include a cylindrical cutter 103B. The cylindrical cutter 103B is arranged on the interior side of the gear-shaped cutter 103A. In addition, a sub-cutting edge 104D can be provided on the tip end of the cylindrical cutter. The sub-cutting 104D and the cutting edges 104 of the gear-shaped cutter 103A lie in the same plane. The gear-shaped sheet 111 is held to the gear-shaped cutter 103A by the cylindrical cutter 103B when a through hole is formed in the gear-shaped sheet 111. This cutting tool can shape the gear-shaped sheet 111 which has a helical exterior gear shape, and has a through hole at the center of the gear-shaped sheet 111. In addition, this cutting tool can suppress distortion of outer and inner peripheral surfaces of a gear-shaped sheet. As a result, this cutting tool can precisely provide the shape of a gear.

A method for producing a gear-shaped cutting edge for die-cutting a fiber mat 10, which can be used for fiber-reinforced-plastic gear and placed on a die-cutting surface of a workpiece rest, into a gear shape, according to the present invention includes cutting/grinding, hardening and finish-grinding steps. In the cutting/grinding step, a cylindrical member is formed from a block of metal formed of steel, and an end of the cylindrical member is cut into cutting edges which form a gear shape so that the cylindrical member is formed into a cut/ground cylindrical member. In the hardening step, the cut/ground cylindrical member, which is formed in the cutting/grinding step, is hardened as the hardened cylindrical member. In the finish-grinding step, the hardened cylindrical member is finish-ground so as to providing the gear-shaped cutter.

In the cutting/grinding step, the interior surface of the metal block is formed into the gear shape by electrical discharge machining, and its tip end is ground so as to form tooth-top cutting edges. In addition to this, the outer peripheral surface of the metal block is ground so as to form V-shaped grooves 16 which are spaced at a fixed interval away from each other and become shallower from the cutting edges 4 of the cylindrical member 20 toward the base end. Tooth-bottom cutting edges 4B and tooth-surface cutting edges 4C which are included in the cutting edges 4 are formed on the tip end edges of V-shaped grooves 16. The tooth-top cutting edges 4A, the tooth-surface cutting edges 4C, and the tooth-bottom cutting edges 4B which are included in the cutting edge 4 are formed on the tip end edges of the gear-shaped cutting edge portion 3A. The wedge angle ($\alpha 1$) of the tooth-bottom line 17 from the tooth-bottom cutting edge 4B to the base end of the gear-shaped cutter 3A is greater than the wedge angle ($\alpha 2$) from the tooth-top cutting edges 4A to the base end of the gear-shaped cutter 3A. The thickness (W1) of the base-side end of the tooth-bottom cutting edge 4B is greater than the thickness (W2) of the base-side end of the tooth-top cutting edge 4A. In the hardening step, the cutting edges 4 are hardened. In the finish-grinding step, the cutting edge 4 is finish-ground so as to provide the gear-shaped cutter.

Also, the present invention provides a method for a cutting tool which can be used to die-cut a fiber mat to be used for a helical gear. The method can produce a gear-shaped cutting edge 103A for die-cutting a fiber mat 110, which can be used for fiber-reinforced-plastics helical-gear and placed on a die-cutting surface 102 of a workpiece rest 101, into a helical-gear-shaped mat 111. The method for producing the gear-shaped cutting edge 103A includes cutting/grinding, hardening and finish-grinding step. In the cutting/grinding step, a cylindrical member formed of steel having a predetermined thickness is cut into a cut/ground cutting tool member 131 including cutting edges 104 which is arranged on the tip end edge of the cylindrical member and can be used to die-cut the fiber mat 110 into a helical gear shape. In the hardening step, the cut/ground cutting tool member 131 is hardened whereby providing the hardened cutting tool member. In the finish-grinding step, the hardened cutting tool member is finish-ground. The cutting/grinding step includes a step for cutting the inner peripheral surface, and a step for cutting the outer peripheral surface. In the step for cutting the inner peripheral surface, the inner peripheral surface of the cylindrical member is cut so as to form protrusions 122 and lengthwise grooves 121 which are alternately arranged and spaced at a fixed interval away from each other in the circumferential direction. The protrusions 122 and lengthwise grooves 121 extend parallel to each other on the inner peripheral surface of the cylindrical member. In the step for cutting the outer peripheral surface, the outer peripheral surface of the cylindrical member is cut so as to form V-shaped grooves 116 on the outer peripheral surface of the cylindrical member. The V-shaped grooves 116 are spaced at a fixed interval away from each other. The V-shaped grooves 116 are arranged at the positions of the cylindrical member that are located on the exterior side of the protrusions 122, which are formed in the step for cutting the inner peripheral surface. The tip end edges of the V-shaped groove 116 serve as tooth-bottom cutting edge 104B and tooth-surface cutting edges 104C. A tooth-top cutting edge 104A is arranged between the V-shaped grooves 116. The protrusions 122, the lengthwise grooves 121 and the V-shaped grooves 116 are inclined at a predetermined angle with respect to the center axis. The V-shaped grooves 116, which are formed in the step for cutting the outer peripheral surface, become shallower from the tip end edge of the V-shaped groove 116 toward the base end of the cylindrical member. The wedge angle ($\alpha 1$) of the tooth-bottom cutting edge 104B is greater than the wedge angle ($\alpha 2$) of the tooth-top cutting edge 104A. The gear-shaped cutter 103A has different thicknesses on its base-side end. The thickness (W1) of the base-side end of the tooth-bottom cutting edge 104B is greater than the thickness (W2) of the base-side end of the tooth-top cutting edge 104A.

According to the aforementioned method, a gear-shaped cutter can be produced at low cost. By using this, even a thick fiber laminated mats formed of reinforcement fiber layers can be efficiently and precisely die-cut into a predetermined helical gear shape, and a large number of fiber mats can be repeatedly and precisely die-cut into a predetermined gear shape. Consequently, helical-gear-shaped fiber mats, which can be used for a fiber-reinforced-plastics helical-gear, can be efficiently die-cut.

In the method for producing a fiber mat cutting tool according to the present invention, the protrusions 122 and the lengthwise grooves 121 are formed on the interior surface of the cylindrical member formed of steel by electrical discharge machining in the step for cutting the inner peripheral surface. According to this method, a cylindrical member formed of steel can be efficiently formed to form its interior surface into helical gear shape.

The present invention provides a method for die-cutting a fiber mat into a helical gear-shaped sheet. A fiber mat 110 is placed on a die-cutting surface 102 of a workpiece rest 101 when the fiber mat 110 is die-cut into a helical exterior gear shape by the cutting tool 103. In this die-cutting method, as the cutting tool 103, a cylindrical gear-shaped cutter 103A is used which includes cutting edges 104 on its tip end edge. The cutting edges 104 include tooth-top cutting edges 104A for shaping the tops of the teeth of the helical gear, tooth-bottom cutting edges 1046 for shaping the bottoms of the tooth spaces of the helical gear, and tooth-surface cutting edges 104C for shaping the tooth surfaces of the helical gear. One or both of the gear-shaped cutter 103A and the workpiece rest 101 are rotated when the gear-shaped cutter 103A is moved toward the die-cutting surface 102 of the workpiece rest 101 so as to rotate the gear-shaped cutter 103A relative to the workpiece rest 101 whereby die-cutting the fiber mat 110 into a helical gear-shaped fiber mat 111.

According to the aforementioned die-cutting method, by using a gear-shaped cutter can be produced at low cost, even a thick fiber laminated mats formed of reinforcement fiber layers can be efficiently and precisely die-cut into a predetermined helical gear shape, and a large number of fiber mats can be repeatedly and precisely die-cut into a predetermined gear shape. Consequently, helical-gear-shaped fiber mats, which can be used for a fiber-reinforced-plastics helical-gear, can be efficiently die-cut.

In the aforementioned method for die-cutting a fiber mat according to the present invention, the gear-shaped cutter 103A which can be used to die-cut the fiber mat can have all of the following features A to C.

A) V-shaped grooves 116 are formed on the exterior surface of the gear-shaped cutter 103A from the tip end edge toward the base end of the gear-shaped cutter 103 and spaced at a predetermined interval away from each other, and the tip end edges of the V-shaped grooves 116 serve as the tooth-bottom cutting edges 104B and the tooth-surface cutting edges 104C, and lengthwise grooves 121 and protrusions 122 extend in the movement direction from the tip end toward the base end of the gear-shaped cutter 103A, and are alternately arranged on the interior surface of the gear-shaped cutter 103A and spaced at a predetermined interval away from each other.

B) The tip end edge of the lengthwise groove 121 serves as the tooth-top cutting edge 104A of the gear-shaped cutter 103A. The tip end edge between the lengthwise groove 121 and the protrusion 122 serves as the tooth-surface cutting edge 104C. The tip end edge of the protrusion 122 serves as the tooth-bottom cutting edge 104B.

C) The protrusions 122 are arranged at the positions of the gear-shaped cutter 103A that are located on the interior side of the V-shaped grooves 116. The V-shaped grooves 116 and the protrusions 122 are inclined at a predetermined angle with respect to the center axis of the gear-shaped cutter 103A.

In the aforementioned method for die-cutting a fiber mat, which can be used for a helical-gear, according to the present invention, the gear-shaped cutter 103 which can be used to die-cut the fiber mat can have the following features A and B.

A) The cutting tool 103 includes a cylindrical cutter 103B that is concentrically arranged on the interior side of the gear-shaped cutter 103A and is coupled to the gear-shaped cutter 103A.

B) The cylindrical cutter 103B includes sub-cutting edge 104D on its tip end. The sub-cutting edge 104D lie in the same plane as cutting edges 104 that are arranged on the tip end of the gear-shaped cutter 103A.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
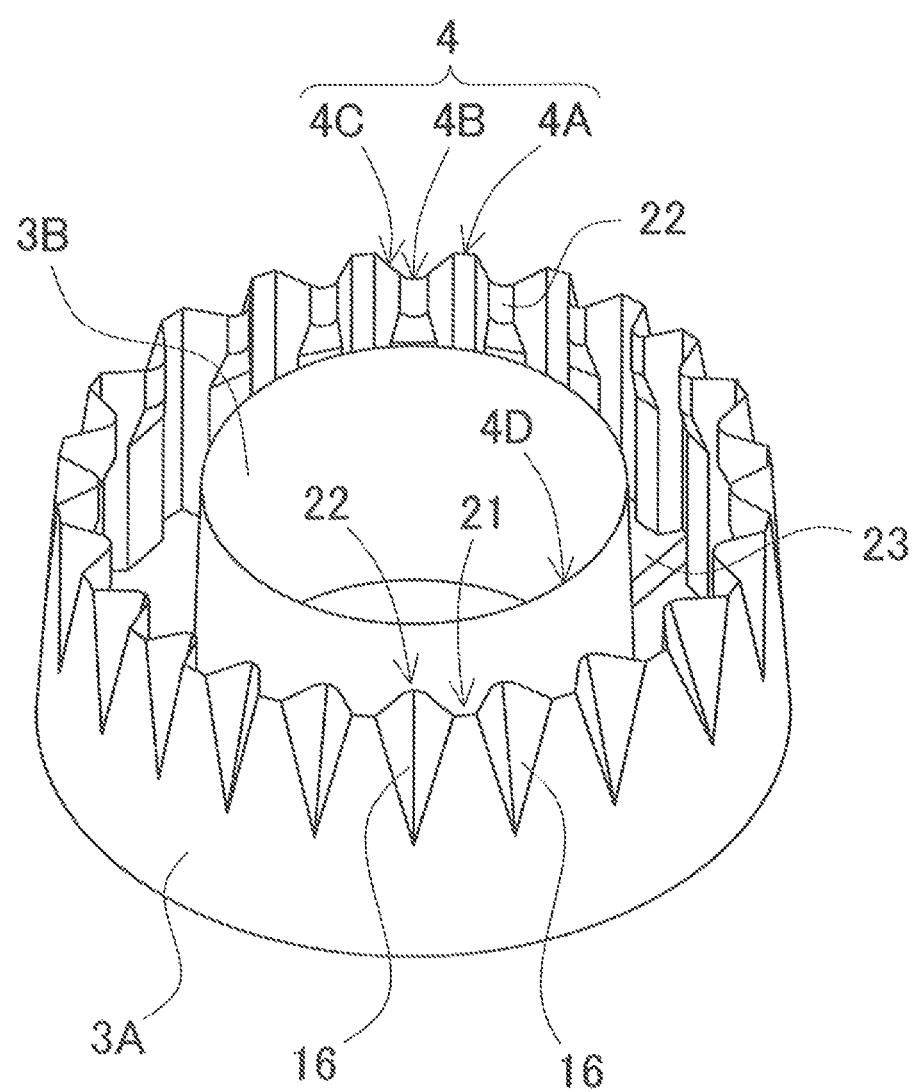
FIG. 1 is a perspective view of a cutting tool to be used for a die-cutting device according to an embodiment of the present invention.
Figure 2:
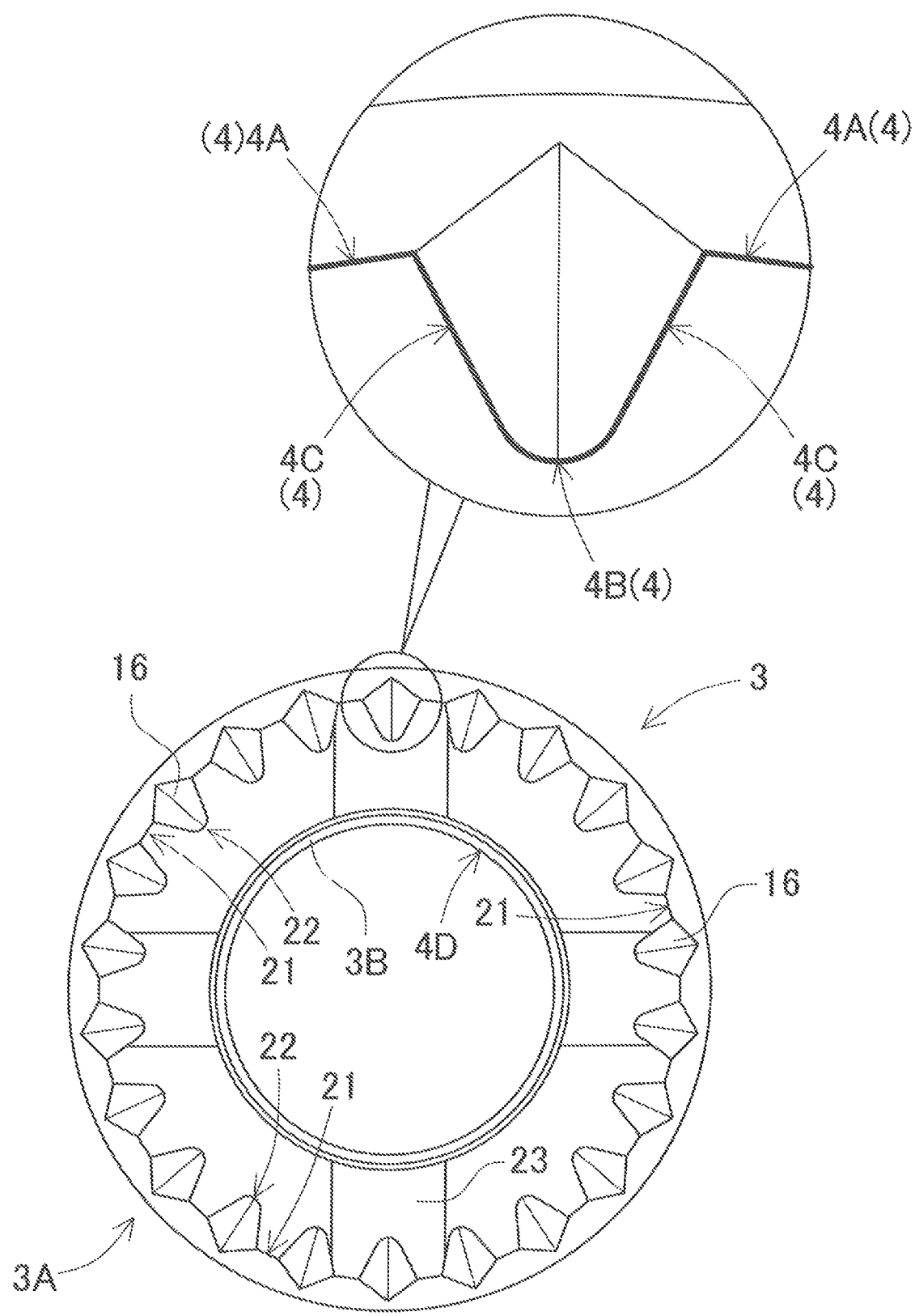
FIG. 2 is a plan view of the cutting tool shown in FIG. 1.
Figure 3:
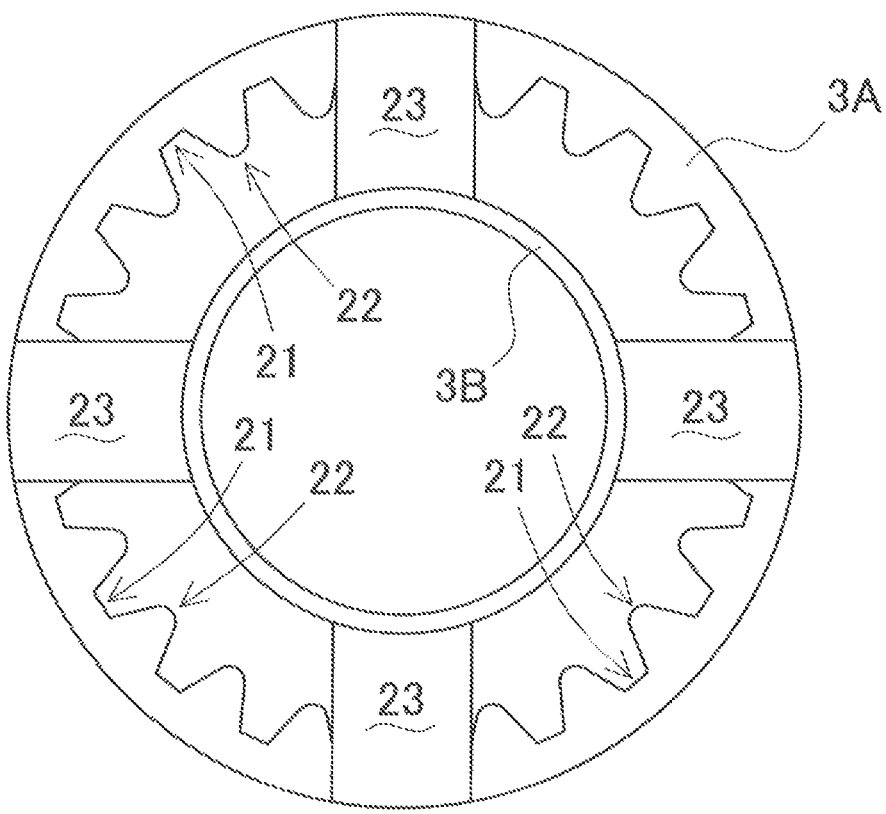
FIG. 3 is a bottom view of the cutting tool shown in FIG. 1.

The embodiments will now be described with reference to the accompanying drawings, wherein like reference numerals designate corresponding or identical elements throughout the various drawings.

It should be appreciated, however, that the embodiments described below are illustrations of a die-cutting device for die-cutting a fiber mat, which can be used for a fiber-reinforced-plastic gear, and a method for producing a cutting tool for die-cutting a fiber mat, which can be used for a fiber-reinforced-plastic gear, to give a concrete form to technical ideas of the invention, and a die-cutting device for die-cutting a fiber mat and a method for producing a cutting tool for die-cutting a fiber mat of the invention are not specifically limited to description below. In this specification, reference numerals corresponding to components illustrated in the embodiments are added in "Claims" and "SUMMARY OF THE INVENTION" to aid understanding of claims. However, it should be appreciated that the members shown in claims attached hereto are not specifically limited to members in the embodiments.

The die-cutting device according to the present invention can be used to die-cuts a fiber mat (workpiece) into a gear-shaped sheet. The gear-shaped sheet can be used as reinforcement fibers for a fiber-reinforced-plastic gear. In the case where a fiber mat of prepreg is die-cut into a gear-shaped sheet, plastic is cured under pressure to provide a fiber-reinforced-plastic gear. In the case where a gear-shaped sheet does not include plastic, the gear-shaped sheet is impregnated with plastic or is embedded in plastic, and the plastic is formed into a fiber-reinforced-plastic gear. The outer peripheral surfaces of the fiber-reinforced-plastic gear that includes the embedded gear-shaped sheet are cut/ground after the plastic is cured, or are finish-ground (subjected to finish grinding) whereby providing a precise fiber-reinforced-plastic gear having a highly precise exterior shape. The present invention does not relate to an apparatus and method for producing a fiber-reinforced-plastic gear from its materials to the final product, but relates to a die-cutting device and cutting tool for die-cutting a fiber mat, which can be used for a fiber-reinforced-plastic gear. From this view point, apparatuses and methods for producing a fiber-reinforced-plastic gear that have been used or will be developed can use a die-cutting device or cutting tool according to the present invention when producing a fiber-reinforced-plastic gear from a gear-shaped sheet that is formed by using this die-cutting device or cutting tool.

A fiber mat which can be used for a fiber-reinforced plastic gear can be a fiber mat which is formed of distributed organic fibers (e.g., aramid fiber (aromatic polyamide fiber) and polyamide fiber) or inorganic fiber (e.g., carbon fiber, silicon carbide fiber, alumina fiber, glass fiber and metal fiber) and has a predetermined thickness, or prepreg which is formed of fibers combined with thermoplastic or thermosetting resin. In the case where a fiber mat has a three-dimensional structure, exfoliation of fiber layers can be prevented particularly by fibers that extend in the thickness direction. A fiber-reinforced plastic gear which includes an embedded fiber mat as reinforcement fibers can have strength equivalent to metal gears.

Gear-shaped sheets which are formed by die-cutting fiber mats into gear shapes can be embedded with or without a laminated structure to produce fiber-reinforced plastic gears.

The width of teeth (i.e., thickness) of a fiber-reinforced plastic gear can be adjusted by the number of laminated gear-shaped sheets if a thick fiber-reinforced plastic gear is required. Even in the case where a thin gear-shaped sheet is used, a fiber-reinforced plastic gear with a large tooth width can be provided by a number of laminated thin gear-shaped sheets. In the case where a fiber-reinforced plastic gear is formed of laminated gear-shaped sheets, the number of laminated sheets is adjusted depending on the thickness of the gear-shaped sheets, and the tooth width of the fiber-reinforced plastic gear.

Figure 8:
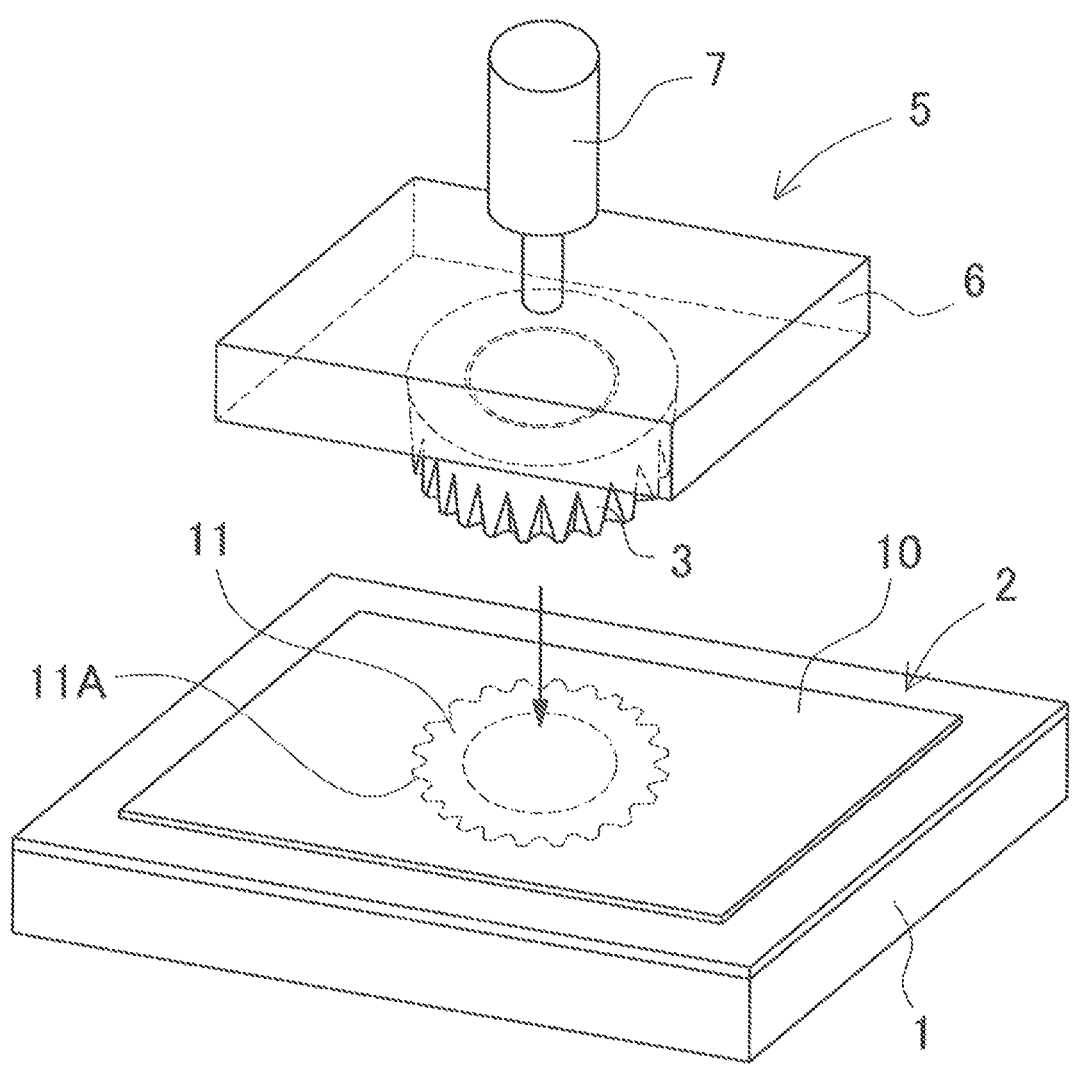
FIG. 8 is a schematic perspective view of the die-cutting device for die-cutting a fiber mat.

A cutting device for die-cutting a fiber mat, which can be used for a fiber-reinforced-plastic gear, shown in FIG. 8 includes a workpiece rest 1, a cutting tool 3, and a cutting tool drive mechanism 5. A die-cutting surface 2 is provided on the upper surface side of the workpiece rest 1. The fiber mat 10 can be placed on the die-cutting surface 2 when being die-cut by the cutting tool 3. The cutting tool 3 can be moved toward the die-cutting surface 2 of the workpiece rest 1 to die-cut the fiber mat 10 placed on the die-cutting surface 2 into a gear shape. The cutting tool drive mechanism 5 moves the cutting tool 3 toward and away from the die-cutting surface 2.

The workpiece rest 1 is constructed of a metal plate. The die-cutting surface 2 is flat. The workpiece rest may be entirely formed of plastic or rubber. Also, the surface part of the workpiece rest may be formed of plastic or rubber. The workpiece rest shown in FIG. 8 is constructed of a metal plate, and an elastic sheet 1A is laminated on its surface. The elastic sheet 1A is an elastic rubber sheet with a thickness falling within the range from 1 to 10 mm. In the case where the workpiece rest 1 includes the elastic sheet 1A laminated on its upper surface, after cutting edges 4 of the cutting tool 3 is brought in tight contact with the elastic sheet 1A, or the cutting edges 4 of the cutting tool 3 is inserted into the elastic sheet 1A, the fiber mat 10 can be die-cut by the cutting tool 3, As a result, the die-cut edges 11A of the gear-shaped sheet 11 can be surely finely formed when the fiber mat 10 is die-cut. However, the elastic sheet is not necessarily laminated on the upper surface of the workpiece rest. After the cutting tool is positioned close to or in contact with the die-cutting surface of the workpiece rest, the fiber mat can be die-cut.

The cutting tool drive mechanism 5 moves the cutting tool 3 upward and downward so that the fiber mat 10 placed on the die-cutting surface 2 of the workpiece rest 1 is die-cut by the cutting tool 3. The cutting tool drive mechanism 5 includes a movable base 6, a cylinder 7 which moves the movable base 6 upward and downward. The cutting tool 3 is fastened to the movable base 6. More specifically, the cutting tool 3 is fastened to the lower surface of the movable base 6. The movable base 6 is moved upward and downward by the cylinder 7 so that the fiber mat 10 is die-cut into the gear shape on the workpiece rest 1. That is, when the cutting tool 3 is moved downward by the cutting tool drive mechanism 5, the fiber mat 10 which is placed on the die-cutting surface 2 of the workpiece rest 1 is sandwiched between the workpiece rest 1 and the cutting tool 3, and is die-cut into the gear shape.

The cutting tool 3 shown in FIGS. 1 to 5 includes a gear-shaped cutter 3A, and cylindrical cutter 3B. The gear-shaped cutter 3A die-cuts the fiber mat 10 into the gear shape. The cylindrical cutter 3B is arranged on the interior side of the gear-shaped cutter 3A, and forms a through hole at the center of the gear-shaped sheet 11 which is die-cut into the gear shape.

The fiber mat 10 is die-cut into the gear-shaped sheet 11 by the gear-shaped cutter 3A of the cutting tool 3, while the through hole is formed by the cylindrical cutter 3B of the cutting tool 3 at the center of the gear-shaped sheet 11, which is die-cut out into the gear shape. The gear-shaped cutter 3A and the cylindrical cutter 3B include the cutting edges 4 on their tip ends which lie in the same plane. The exterior shape and through hole of the fiber mat 10 are simultaneously formed by die-cutting. The gear-shaped sheet 11 that is die-cut by this cutting tool 3 is used for a fiber-reinforced plastic gear which has a through hole at its center. Although the cutting tool 3 shown in FIG. 1 includes the gear-shaped cutter 3A and the cylindrical cutter 3B, and forms the gear-shaped sheet 11 which has the through hole at its center is cut out, the cutting tool 3 does not necessarily include the cylindrical cutter 3B. The cutting tool 3 can include only the gear-shaped cutter 3A. The cutting tool 3 that does not include the cylindrical cutter 3B shapes the gear-shaped sheet 11 without the through hole at its center. The gear-shaped sheet without the through hole at its center can be used for a fiber-reinforced plastic gear without the through hole at its center. Also, the center through hole may be formed in a later process so that a fiber-reinforced plastic gear with a through hole is formed.

Dissimilar to conventional cutting tools 3, the gear-shaped cutter 3A is not produced by bending a metal plate into a gear shape. The gear-shaped cutter 3A is produced by cutting/grinding a block of metal 19. The metal block 19 has a cylindrical shape or a thick plate shape. The metal block 19 is subjected to electrical discharge machining and formed into a cylindrical shape. Subsequently, this cylindrical member is subjected to the cutting/grinding process. The thickness of the metal block 19 is dimensioned equal to the length of the gear-shaped cutter 3A (more specifically, the movement distance). The length of the gear-shaped cutter 3A, i.e., the thickness of the metal block 19, is adjusted in accordance with the outer diameter of a gear to be formed by die-cutting (blanking). For example, the thickness of the metal block 19, i.e., the length of the gear-shaped cutter 3A is not smaller than 20% and not greater than 200% of the outer diameters of the fiber-reinforced plastic gear, preferably not smaller than 30% and not greater than 150%, more preferably not smaller than 35% and not greater than 100%. For example, in the case where the gear-shaped cutter 3A is produced which die-cuts the fiber mat 10 to be used a fiber-reinforced plastic gear with an outer diameter of 100 mm, the thickness of the metal block 19 to be formed into this gear-shaped cutter 3A can be 45 mm.

The content of carbon of a metal block formed of carbon steel is adjusted to an optimal value in consideration of the hardness and brittleness required for the gear-shaped cutter. The hardness of the gear-shaped cutter can be increased by increasing the content of carbon. However, the gear-shaped cutter will become brittle if the content of carbon is too much. For example, the content of carbon of the metal block 19 can be not greater than 1.4%, preferably not greater than 0.7%, and optimally not smaller than 0.4%. In this specification, the content of carbon is expressed in percent-by-mass. After the metal block 19 is formed into a cylindrical shape by electrical discharge machining, the gear-shaped cutting edges 4 is formed at the tip end of the cylindrical member by a grindstone or file. Subsequently, the cylindrical member is hardened and then further finish-ground whereby forming the gear-shaped cutter 3A. The cutting edge 4 die-cuts the fiber mat 10 that is placed on the die-cutting surface 2 of the workpiece rest 1 into the gear shape. The cutting edges 4, more specifically the tip edges of the cutting edges are positioned to lie in a plane parallel to the die-cutting surface 2, and then the tip edges are slightly engaged in the elastic sheet 1A laminated on the surface of the workpiece rest so that the fiber mat 10 is die-cut into the gear shape. The cylindrical cutter 3B, which is arranged on the interior side of the gear-shaped cutter 3A, is formed of a carbon steel plate the carbon content of which is similar to the metal block 19. The gear-shaped cutter can be formed of a steel material such as high-speed steel instead of carbon steel. Also a sub-cutting edge 4D of the cylindrical cutter 3B die-cuts the fiber mat 10 placed on the die-cutting surface 2 of the workpiece rest 1 whereby forming the through hole. The tip edge of the sub-cutting edge 4D is positioned to lie in a plane parallel to the die-cutting surface 2 of the workpiece rest 1, and then the tip edge is slightly engaged in the elastic sheet 1A laminated on the surface of the workpiece rest so that the fiber mat 10 is die-cut.

Figure 7:
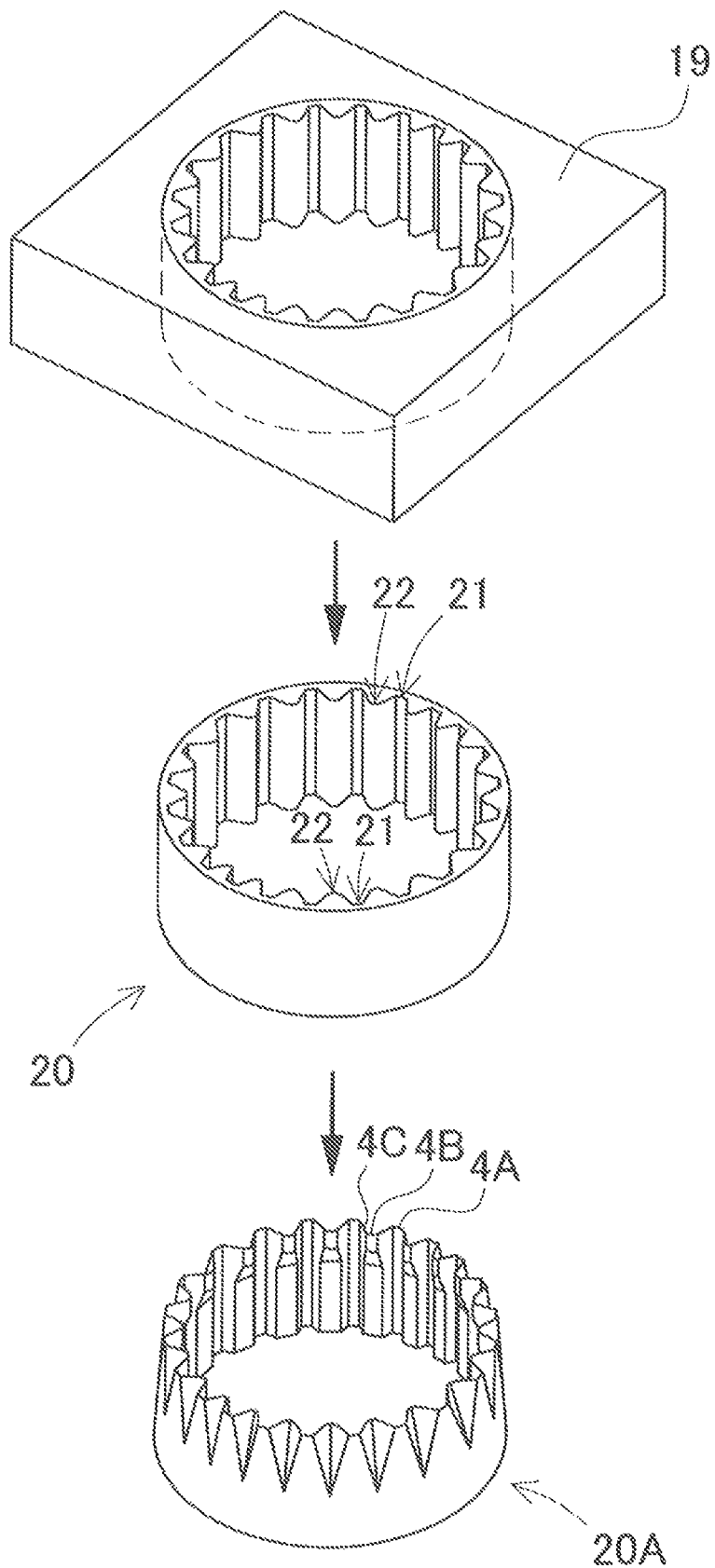
FIG. 7 is a perspective view showing processes for cutting a block of metal into a cylindrical member by electrical discharge machining, and grinding the cylindrical member so as to form a gear-shaped cutter.

FIG. 7 shows the shape of the gear-shaped cutter that is produced by the following production processes.

(Cutting/Grinding Process)

As shown in FIG. 7, in this cutting/grinding process, the metal block 19 is formed into a cylindrical shape with a predetermined thickness by electrical discharge machining. In the electrical discharge machining, wire (not shown) passes through the metal block 19, and an electric spark is emitted between the wire and the metal block 19 so that a cylindrical member 20 is separated from the metal block 19. In the electrical discharge machining, the wire is moved relative to the metal block 19 so that the metal block 19 is cut into a cylindrical shape as the cylindrical member 20. The cylindrical member 20, which is separated from the metal block 19 by electrical discharge machining, includes lengthwise groove 21 and protrusion 22 which extend on the interior surface in the upward-and-downward movement direction of the cutting tool. The lengthwise groove 21 and protrusion 22 are alternately arranged so as to form the gear shape. Subsequently, the outer peripheral surface of the cylindrical member 20 is cut/ground. More specifically, the tip end edges of the lengthwise grooves 21 which are arranged on the interior surface of the cylindrical member 20 are cut and formed as tooth-top cutting edges 4A. The tip end edges on the both side surfaces of the protrusion 22 which are arranged between the lengthwise grooves 21 are cut and formed as the tooth-surface cutting edge 4C. The tip end edges of the bottom (interior side) parts of the grooves are cut and formed as tooth-bottom cutting edge 4B.

The gear shape of the interior surface of the cylindrical member 20 is fixed from the cutting edges to the base end. The lengthwise grooves 21 and the protrusions 22 of the cylindrical member 20 extend parallel to the movement direction of the gear-shaped cutter 3A, that is, parallel to the center axis of the gear-shaped cutter 3A. However, the cylindrical member 20 may be tapered so that the diameter of the interior surface where the lengthwise grooves 21 and the protrusions 22 are alternately arranged gradually increases from the cutting edges toward the base end.

The cylindrical member 20 shown in FIG. 7 has a cylindrical external surface the shape which extends along a circular cylinder. By electrical discharge machining, the metal block can be formed into a cylindrical member which has a cylindrical external surface and an interior surface having a fixed cross-sectional shape in the direction from the cutting edges to the base end as its gear shape. Both the interior and external surfaces of the cylindrical member can be cut by orientating the electrical discharge machining wire perpendicular to both the upper and lower surfaces of the metal block and moving the wire relative to the metal block in X and Y axis directions in the plane parallel to both the upper and lower surfaces. However, the cylindrical member may have an interior surface having a fixed cross-sectional shape in the direction from the cutting edges to the base end, and a tapered exterior surface the diameter of which gradually increases from the cutting edges toward the base end. Also, the cylindrical member may have tapered interior and external surfaces the diameter of which gradually increases from the cutting edges toward the base end. In the case where a cylindrical metal block is used to form the cylindrical member, if the outer diameter of the cylindrical metal block is equal to the cylindrical member, only the interior shape of the cylindrical member can be shaped by electrical discharge machining.

In the case where the cylindrical member 20 has a cylindrical exterior surface, the exterior-side surface is tapered by grinding so that the outer diameter of the cylindrical member 20 increases from the cutting edges toward the base end. In the case where the exterior surface of the cylindrical member has been formed into a tapered shape by cutting in the cutting/grinding process, it is possible to omit the process for forming the tapered exterior surface by grinding. In addition, the cutting edges 4 are formed on the tip end of the cylindrical member 20 by grinding the exterior-side surface of the tip end of the cylindrical member 20. Thus, the cut/ground cylindrical member 20A is produced which have the cutting edges 4 having a single-edged shape.

The cutting edges 4 for die-cutting the fiber mat 10 has a gear shape which is defined by the tooth-top cutting edges 4A, the tooth-surface cutting edges 4C, and the tooth-bottom cutting edges 4B connected to each other. The tooth-top cutting edge 4A die-cuts a fiber mat into a part which serves as the top of a tooth of a gear. The tooth-surface cutting edge 4C die-cuts the fiber mat into a part which serves as a tooth surface of the gear. The tooth-bottom cutting edge 4B die-cuts the fiber mat into a part which serves as the bottom of the tooth space of the gear. The cutting edges 4 which are constructed of the tooth-top cutting edges 4A, the tooth-surface cutting edges 4C and the tooth-bottom cutting edges 4B are formed by grinding the exterior-side surface of the cylindrical member 20 so as to shape the interior surface into a gear shape.

The tooth-surface cutting edges 4C and the tooth-bottom cutting edges 4B which have a single-edged shape are formed by grinding the exterior surface of tip end of the cylindrical member 20 into V-shaped grooves 16. The tooth-surface cutting edges 4C are arranged on the both-side surfaces of the V-shaped groove 16. The tooth-bottom cutting edge 4B is arranged along the bottom part of the V-shaped groove 16. In order to form the tooth-bottom cutting edge 4B along in the groove bottom of V-shaped groove 16, as shown in the drawings, the groove bottom has a predetermined radius of curvature. Alternatively, the groove bottom may have a predetermined width although not illustrated. The depth of the V-shaped groove 16 gradually decreases from the cutting edges toward the base end of the cylindrical member 20 so that the wedge angle of the tooth-bottom cutting edge 4B is greater than the wedge angle of the tooth-top cutting edge 4A.

Figure 4:
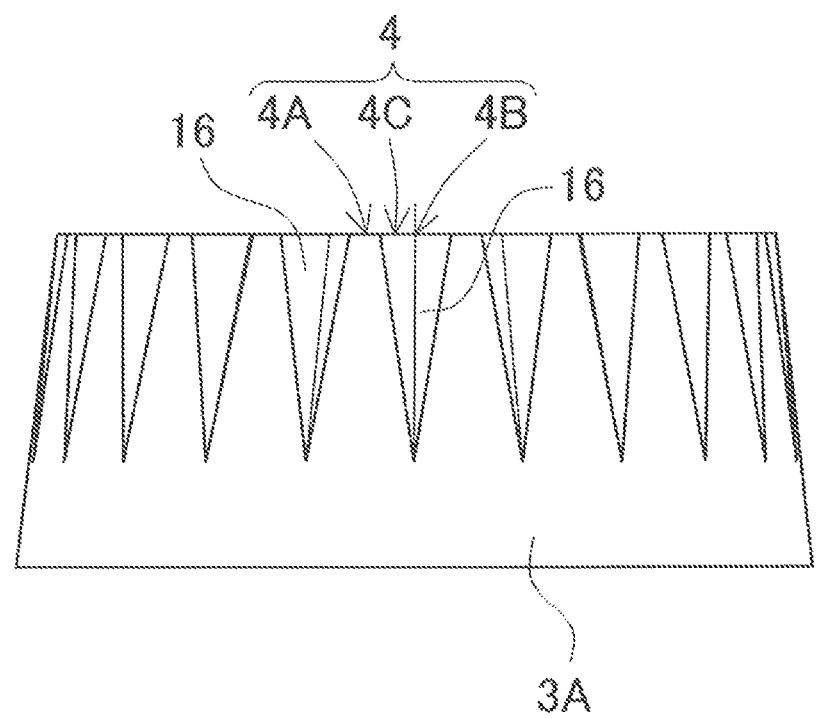
FIG. 4 is a front view of the cutting tool shown in FIG. 1.
Figure 5:
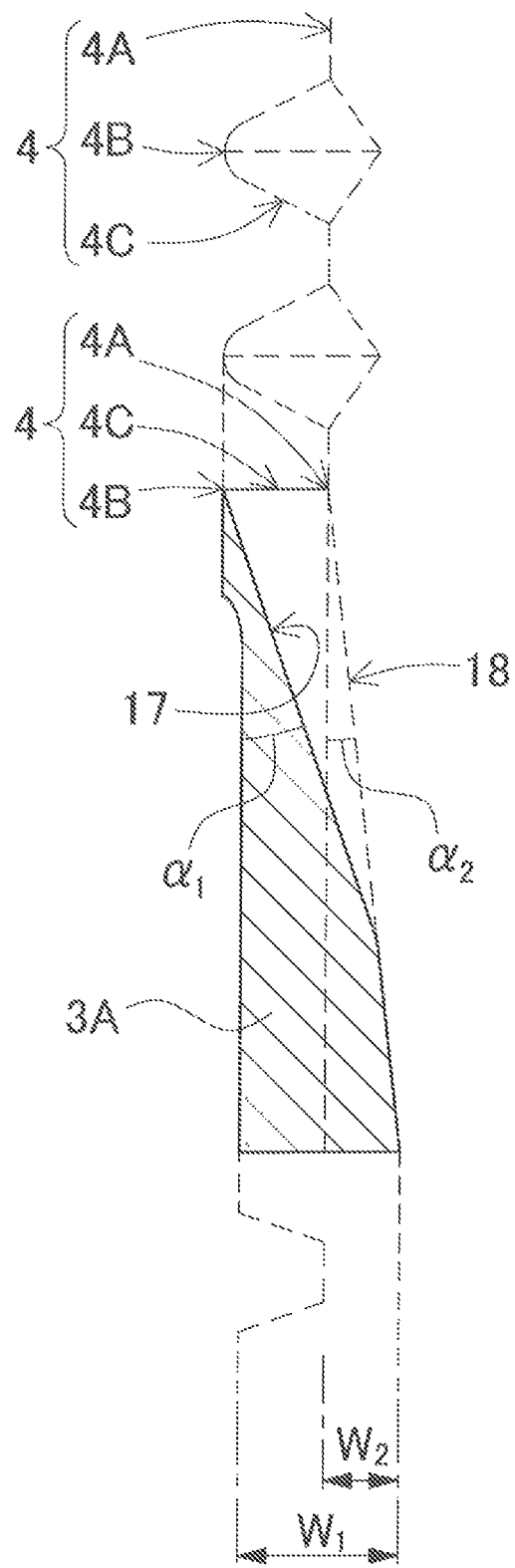
FIG. 5 is a vertical cross-sectional view of a part of a tooth-bottom cutting edge and a tooth-top cutting edge of the cutting tool show in FIG. 1.
Figure 6:
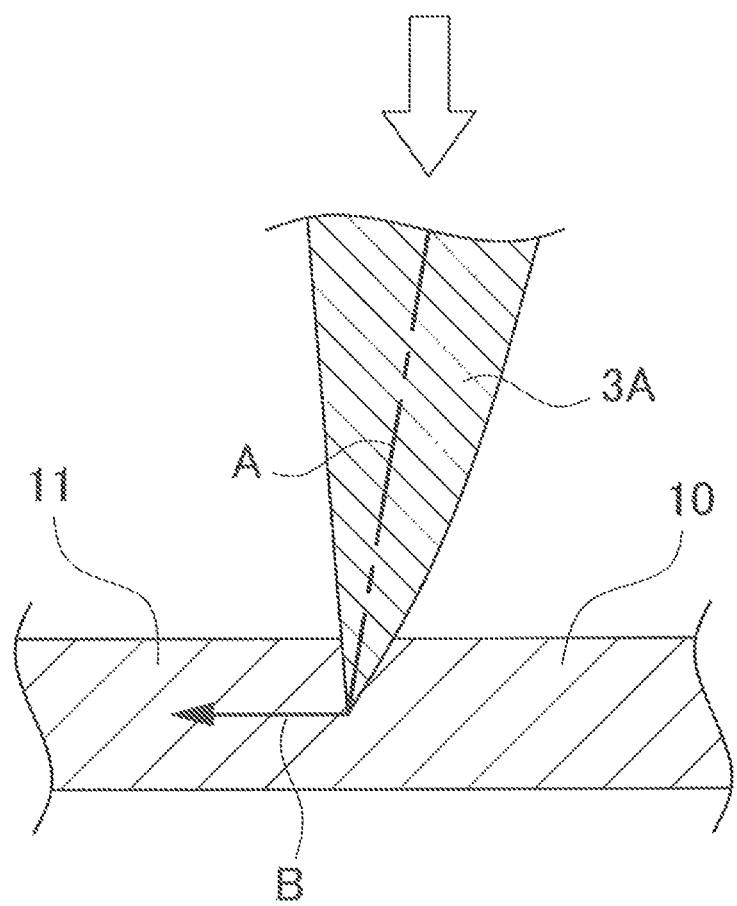
FIG. 6 is a cross-sectional view showing the tooth-bottom cutting edge of the cutting tool when a fiber mat is die-cut.

A cross-sectional view of FIG. 5 shows the cross-sectional shapes of the tooth-top cutting edge 4A and the tooth-bottom cutting edge 4B. In FIG. 5, the solid lines show the cross-sectional shape of the tooth-bottom cutting edge 4B, and the dashed lines show the sectional shape of the tooth-top cutting edge 4A. Since the V-shaped groove 16 becomes shallower toward the base end from the cutting edges, the wedge angle of the tooth-bottom cutting edge 4B is dimensioned greater than the wedge angle of the tooth-top cutting edge 4A. As shown in a front view of FIG. 4, the V-shaped grooves 16 of the gear-shaped cutter 3A shown in FIGS. 1 and 5 do not extend to the base end (the bottom side in the FIG. 4) of the cylindrical member 20. In addition to this, the tooth-bottom cutting edges 4B are arranged in parts which protrude toward the interior surface side of the cylindrical member 20. As a result, the thickness (W1) of a base end part of the gear-shaped cutter 3A that serves as the tooth-bottom cutting edge 4B is greater than the thickness (W2) of a base end part of the gear-shaped cutter 3A that serves as the tooth-top cutting edge 4A. This unique structure is very important to achieve excellent durability of the gear-shaped cutter 3A. The reason is that deformation or distortion of the tooth-bottom cutting edges 4B which protrude inward can be prevented when the fiber mat 10 is die-cut. Consequently, the durability of the gear-shaped cutter 3A can be improved.

The V-shaped groove 16 of the gear-shaped cutter 3A shown in FIGS. 1 to 5 becomes shallower toward the base end. The thickness (W1) of the base-side end of the gear-shaped cutter 3A which serves as the tooth-bottom cutting edge 4B is greater than the thickness (W2) of the base-side end of the gear-shaped cutter 3A which serves as the tooth-top cutting edge 4A. As a result, the inclined angle of the tooth-bottom line 17 from the tooth-bottom cutting edge 4B to the base end of the gear-shaped cutter 3A, that is, the wedge angle ($\alpha 1$) of the tooth-bottom cutting edge 4B is greater than the wedge angle ($\alpha 2$) as the inclined angle of the tooth-top cutting edges 4A from the tooth-top cutting edges 4A to the base end of the gear-shaped cutter 3A.

Furthermore, the exterior-side surface of the tip end part of the cutting edge 4 is ground from the tip end edge in an area with a width falling the range from 1 to 5 mm so that the wedge angle gradually increases toward the tip end, and the finished angle of the tip end of the cutting edge falls within the range from not smaller than 10 degrees and not greater than 60 degrees, more preferably not smaller than 15 degrees and not greater than 45 degrees. According to this, the durability can be improved.

The gear-shaped cutter 3A shown in FIG. 5 is tapered by partially grinding the interior-side surface of the cylindrical member 20 so that the size of the interior-side shape of the gear-shaped cutter 3A gradually increases from the tooth-top cutting edges toward the base end of the gear-shaped cutter 3A. In order to provide the tooth-bottom cutting edge 4B, the base end part of the protrusion 22 which protrudes inward of the cylindrical member 20 is ground so that a part of the gear-shaped cutter 3A shown in FIG. 5 where the protrusion 22 is provided becomes larger toward the base end. Since the protrusion 22 protrudes inward, the protrusion 22 can be easily cut/ground. Since the diameter of an opening of the base end of the cylindrical member 20 is large which is formed in the cutting/grinding process, a file or grindstone can be inserted into the cylindrical member 20 through this opening. For this reason, the protrusion 22 can be easily ground. The ground amount of the protrusion 22 of the gear-shaped cutter 3A is increased toward the base end. In other words, the height (protrusion amount) of the protrusions 22 gradually decreases toward the base end of the gear-shaped cutter 3A. As a result, the shape on the interior side (interior-side shape) of the protrusion 22 part gradually increases toward the base end. In the case where the size of the interior-side shape of the gear-shaped cutter 3A becomes larger toward the base end, the gear-shaped sheet 11 that is formed from the fiber mat 10 by die-cutting can be smoothly guided into the interior space of the gear-shaped cutter 3A, and the guided gear-shaped sheet 11 can be immediately removed from the gear-shaped cutter 3A.

In the aforementioned cutting/grinding process, after the metal block is cut out into a cylindrical member by electrical discharge machining, the outer peripheral surface is cut/ground so that the cylindrical member is formed into a cut/ground cylindrical member. However, the cutting/grinding process according to the present invention is not limited to this. For example, after a metal plate with a predetermined thickness is cut out into metal blocks, the metal block can be cut/ground into a cylindrical member, and the interior part of this cylindrical member can be cut out by electrical discharge machining into the cut/ground cylindrical member. Also, after cylindrical metal rod is cut into cylindrical members with a predetermined length (thickness), the interior part of this cylindrical member can be cut out by electrical discharge machining into the cylindrical member. In the case where a cylindrical member is previously formed, the tip end part of this cylindrical member can be cut/ground into cutting edges before or after the electrical discharge machining. For this reason, the order of the process for forming the cutting edges by cutting/grinding and the electrical discharge machining process is not limited.

(Hardening Process)

In order to harden the cutting edge 4, the cut/ground cylindrical member 20A which is formed in the cutting/grinding process is hardened. Thus, the hardened cylindrical member is provided. The HRC hardness of the hardened cutting edge 4 is not smaller than 62, preferably approximately 65. The life of the cutting edge 4 can be long if the hardness of the cutting edge 4 is high. However, if the hardness of the cutting edge 4 too high, the cutting edge 4 may be brittle and likely to be damaged at the die-cutting process. For this reason, the HRC hardness of the hardened cutting edge 4 is higher than 62, preferably higher than 64, and lower than 72 preferably lower than 66. The hardness of the cutting edges 4 after hardening can be adjusted by the carbon content of the cutting edge and the hardening temperature. The hardness of the cutting edge 4 can be high if the hardening temperature is high, and be lower if the hardening temperature is low. For example, in the case where the metal block 19 has a carbon content of 0.6%, and the hardening temperature falls within the range from 780° to 950° C., the HRC hardness of the gear-shaped cutter 3A will fall within the range from 62 to 72. In the case where the metal block has a carbon content of 0.6%, and the hardening temperature is set to 850° C., the HRC hardness of the hardened cutting edges 4 can be 65.

(Finish-Grinding Process)

Finally, the cutting edges 4 of the gear-shaped cutter 3A are sharpened by finish-grinding the hardened cylindrical member in this finish-grinding process. In particular, in the finish-grinding process, the exterior-side surface of the tip part of the cutting edge 4 is finish-ground so that the finished wedge angle is adjusted to the optimum value.

The gear-shaped cutter 3A is produced by the aforementioned processes. The cylindrical cutter 3B is formed from an elongated carbon steel plate. The elongated carbon steel plate is bent into a cylindrical shape which extends along a circular cylinder, and the both ends of the bent elongated carbon steel plate are coupled to each other by welding. Thus, a cylindrical member is formed. The tip end part of this cylindrical member is ground so as to form the cutting edge 4. Subsequently, this cylindrical member is hardened. After that, the cutting edge 4 is further finish-ground. Thus, the cylindrical cutter 3B is produced. The cylindrical cutter 3B is formed from a steel plate with a thickness falling within the range from 2 to 5 mm. Before the hardening process, this steel plate is bent into a cylindrical shape, and a circular sub-cutting edge 4D is formed on the tip end part of the cylindrical member. The circular sub-cutting edge 4D is formed by grinding the interior-side surface of the tip end part of the cylindrical steel plate.

The cylindrical cutter 3B is shaped so that the wedge angle gradually increases toward the sub-cutting edge 4D. According to this shape, the sub-cutting edge 4D can be prevented from being damaged by the impact when a fiber mat is die-cut. In the case where the wedge angle of the cylindrical cutter 3B becomes greater toward the tip end, the finished wedge angle of the cylindrical cutter 3B has an influence on the durability and the die-cutting characteristics of the cylindrical cutter 3B. The finished wedge angle of the cylindrical cutter 3B is dimensioned not smaller than 15 degrees and not greater than 60 degrees, optimally approximately 30 degrees. The cylindrical cutter 3B is also hardened so that the HRC hardness of the cutting edge 4 is equivalent to the gear-shaped cutter 3A.

The cylindrical cutter 3B is coupled to the gear-shaped cutter 3A by coupling members 23. The coupling member 23 is fastened by welding to the base ends of the cylindrical cutter 3B and the gear-shaped cutter 3A so that the cylindrical cutter 3B is arranged concentrically with the gear-shaped cutter 3A, and the sub-cutting edge 4D of the cylindrical cutter 3B and the cutting edges 4 of the gear-shaped cutter 3A lie in the same plane. The cutting tool 3 shown in FIG. 4 includes four coupling members 23 which radially extend between the cylindrical cutter 3B and the gear-shaped cutter 3A whereby coupling them to each other. One end of each of the coupling members 23 shown in FIG. 4 is fastened to the exterior side of the cylindrical cutter 3B by welding, and another end is inserted into and welded to a fit-in recessed part of the gear-shaped cutter 3A. The base end surfaces of the coupling members 23, the cylindrical cutter 3B, and the gear-shaped cutter 3A lie in the same plane. The cutting tool drive mechanism presses the base end of the cutting tool 3, which includes the coupling members 23, the cylindrical cutter 3B, and the gear-shaped cutter 3A lying in the same plane, when the fiber mat 10 is die-cut.

Figure 9:
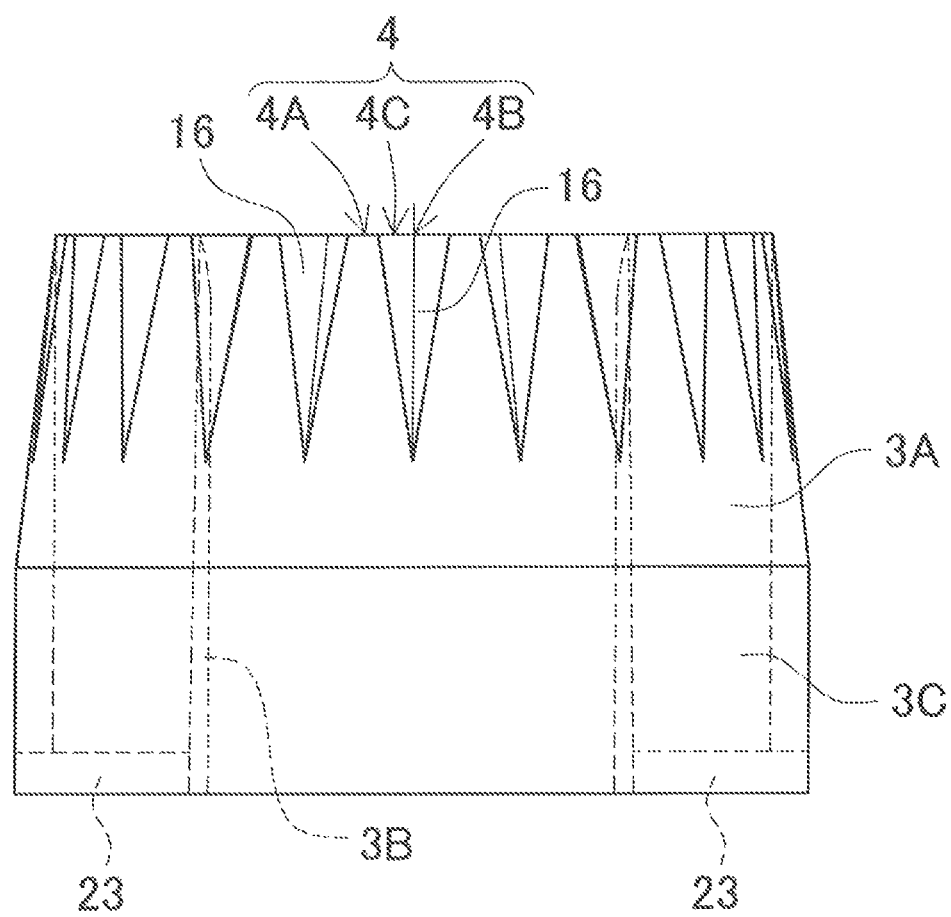
FIG. 9 is a front view of a cutting tool according to another embodiment of the present invention.

The cutting tool shown in FIG. 9 includes a metal base portion 3C which is fastened to the base end surface of the gear-shaped cutter 3A. The metal base portion 3C is formed of a metal with a hardness lower than the gear-shaped cutter 3A. For example, the metal base portion 3C can be formed of a metal having a carbon content lower than the gear-shaped cutter 3A so that the hardness of the metal base portion 3C is lower than the gear-shaped cutter. The metal base portion does not necessarily have a high hardness required for cutting tools. For this reason, the metal base portion can be formed of iron or iron alloy which has a hardness lower than the gear-shaped cutter. The metal base portion 3C is in tight contact with and fastened to the base end surface of the gear-shaped cutter 3A. The gear-shaped cutter is coupled to the cutting tool drive mechanism through the metal base portion. According to this cutting tool, since the metal base portion 3C has a cushioning effect, the impact can be absorbed by the metal base portion 3C when a fiber mat is die-cut. Therefore, even in the case where the hardness of the gear-shaped cutter 3A is high, the tip edges of the gear-shaped cutter 3A can be prevented from being damaged by the impact when a fiber mat is die-cut.

The metal base portion 3C is fastened to the base end of the gear-shaped cutter 3A by welding, and is formed into a cylindrical shape which can guide the die-cut gear-shaped sheet along the interior surface of the metal base portion 3C. The metal base portion 3C preferably has the same interior shape as the gear-shaped cutter 3A at the coupling area between them. In this case, the level difference is not created at the coupling area. As a result, the die-cut gear-shaped sheet can be smoothly guided into the interior surface of the metal base portion 3C without deforming. In the cutting tool shown in FIG. 9, the coupling members 23 are fastened to the metal base portion 3C and the cylindrical cutter 3B so that the cylindrical cutter 3B is coupled to the base end of metal base portion 3C. However, the metal base portion is not limited to a cylindrical member. For example, the metal base portion may be a metal plate with a predetermined thickness, though not illustrated.

Figure 16:
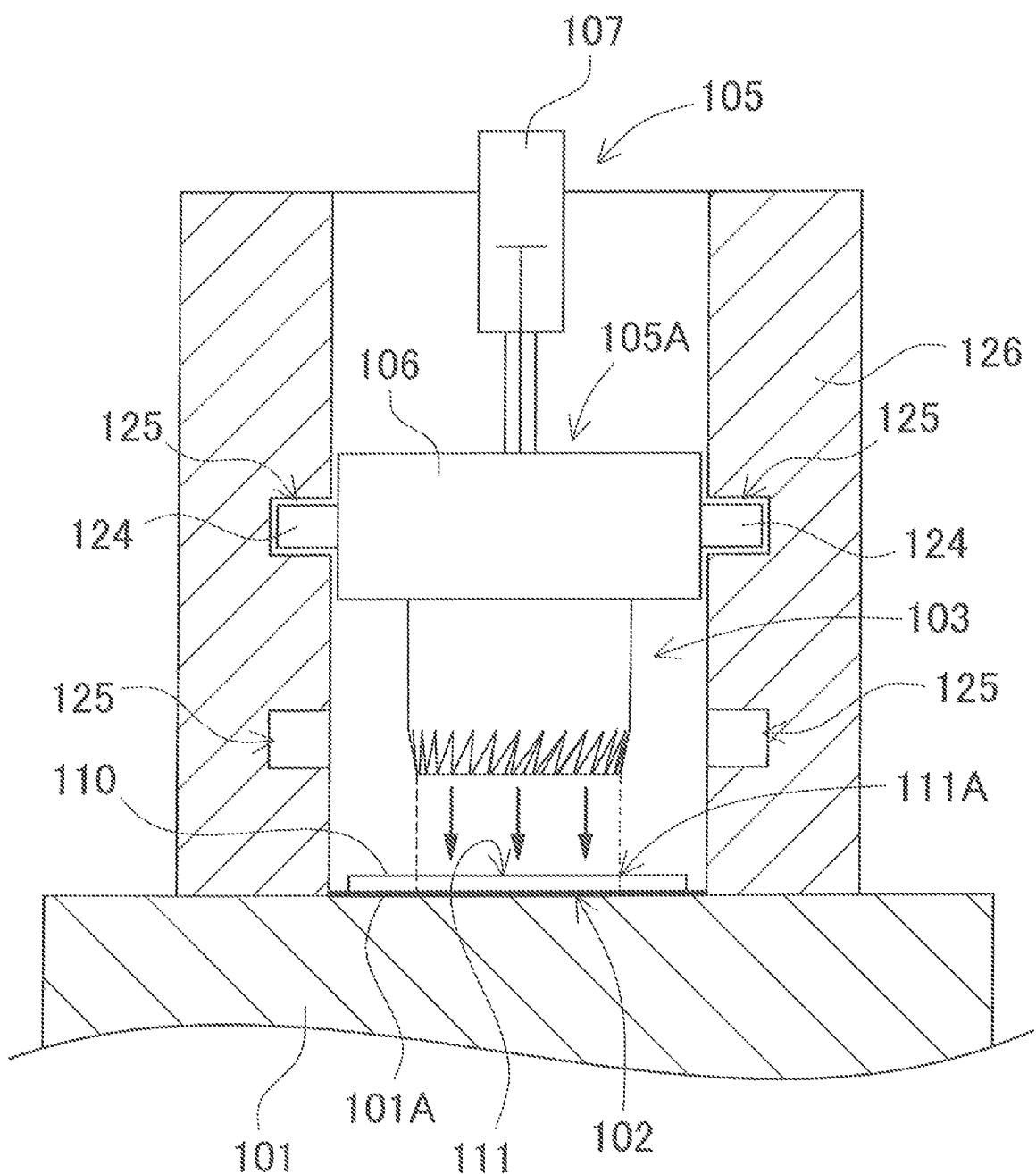
FIG. 16 is a schematic cross-sectional view of the die-cutting device for die-cutting a fiber mat.

A cutting tool according to the present invention die-cuts not only a fiber mat to be used for a fiber-reinforced plastic spur gear but also a fiber mat to be used for a fiber-reinforced plastic helical gear. A die-cutting device shown in FIG. 16 is a device for die-cutting a fiber mat, which can be used for a fiber-reinforced-plastics helical-gear. This device includes a workpiece rest 101, a cutting tool 103, and a cutting tool drive mechanism 105. A die-cutting surface 102 is provided on the upper surface side of the workpiece rest 101. The fiber mat 110 can be placed on the die-cutting surface 102 when being die-cut by a cutting tool 103. The cutting tool 103 can be moved toward the die-cutting surface 102 of the workpiece rest 101 to die-cut the fiber mat 110, which is placed on the die-cutting surface 102, into a helical gear shape. The cutting tool drive mechanism 105 moves the cutting tool 103 toward and away from the die-cutting surface 102.

The workpiece rest 101 is constructed of the same metal plate as the workpiece rest in the device for die-cutting a fiber mat to be used for a spur gear.

The fiber mat 110 is die-cut while the cutting tool drive mechanism 105 rotates the cutting tool 103 about a vertical axis. This cutting tool drive mechanism 105 includes a rotation mechanism 105A for rotating the cutting tool 103. The illustrated cutting tool drive mechanism 105 includes a movable base 106, a cylinder 107 which moves the movable base 106 upward and downward. The cutting tool 103 is fastened to the movable base 106. The movable base 106 is rotated about the vertical axis by the rotation mechanism 105A. More specifically, the cutting tool 103 is fastened in a vertical orientation to the lower surface of the movable base 106. The movable base 106 is rotated by the rotation mechanism 105A, and moved upward and downward by the cylinder 106 so that the fiber mat 110 is die-cut into a helical gear-shaped sheet 111 on the workpiece rest 101. The tops of teeth on the outer peripheral surface of a helical gear are inclined with respect to the rotation axis. Correspondingly, the gear-shaped sheet is die-cut by the cutting tool into a helical gear shape having teeth the tops of which are inclined with respect to the rotation axis on its outer peripheral surface.

The rotation mechanism 105A can rotate the movable base 106 about the vertical axis when the movable base 106 is moved downward. The rotation mechanism 105A rotates the movable base 106 to a predetermined angular position in accordance with the vertical position of the movable base 106. The angular position of the cutting tool 103 is moved by the rotation mechanism 105A so that the cutting edge 104 of the cutting tool 103 can die-cut the fiber mat 110 into a helical gear shape. If the movable base 106 is not rotated when being moved downward, the die-cut gear-shaped sheet will have a spur gear exterior shape. The cutting tool 103 which is rotated by the rotation mechanism 105A when moved downward can die-cut the fiber mat 110 into the gear-shaped sheet 111 having a helical gear shape, that is, having teeth the tops of which are inclined with respect to the rotation axis. Although the aforementioned rotation mechanism 105A rotates the movable base 106 about the vertical axis whereby rotating the cutting tool 103, the rotation mechanism may rotate the workpiece rest or both the movable base and the workpiece rest so as to die-cut a fiber mat in a helical gear shape. In other words, the rotation mechanism in the present invention is not limited to a cutting tool drive mechanism which rotates the movable base. The rotation mechanism in the present invention can be a mechanism which rotates the workpiece rest or both the workpiece rest and the movable base.

The rotation mechanism 105A rotates moves the angular position of the movable base 106 as a function of the vertical position of the movable base 106 when the movable base 106 is moved downward. The inclination angle of the tops of teeth of a helical gear is determined by the angular position of the movable base 106 that is moved by the rotation mechanism 105A when the movable base 106 is moved downward (i.e., the angular position of the movable base 106 as a function of the downward-moved distance of the movable base 106). For this reason, the angular position of the movable base 106 that is moved by the rotation mechanism 105A, more specifically, the angular position of the movable base 106 as a function of the downward-moved distance of the movable base 106 is determined so as to provide the inclination angle the helical gear.

In order to move the angular position of the movable base 106 as a function of the downward-moved distance of the movable base 106, the rotation mechanism 105A shown in FIG. 16 includes guiding protrusions 124, and a spiral guide 126. The guiding protrusions 124 radially protrude outward from the movable base 106. The spiral guide 126 has guiding grooves 125 for guiding the guiding protrusions 124 on its interior surface. The guiding grooves 125 are formed on the interior surface of the spiral guide 126. The guide groove 125 spirally extends. The guiding protrusions 124 are guided along the spiral guide grooves 125 so that the angular position of the movable base 106 is determined when the movable base 106 is moved downward. In this rotation mechanism 105A, the angular position of the movable base 106 as a function of the downward-moved distance of the movable base 106 can be adjusted by adjusting the inclination angle of the guide grooves 125 with respect to the center axis. The inclination angle of the guide grooves 125 with respect to the center axis is set to the inclination angle of the tops of the teeth of the gear-shaped sheet 111 to be formed by die-cutting. Although the illustrated rotation mechanism 105A includes the guiding protrusions 124 at the positions of the outer peripheral surface of the movable base 106 opposed to each other, the present invention is not limited to this. Although not illustrated, a number of guiding protrusions can be arranged on the outer peripheral surface of the movable base, and the corresponding number of guide grooves for guiding the guiding protrusions can be formed on the spiral guide. Although the illustrated rotation mechanism 105A includes the guiding protrusions 124 on the movable base 106, and the guiding grooves 125 on the spiral guide, the present invention is not limited to this. The guiding protrusions can be arranged on the spiral guide, and guide grooves for guiding the guiding protrusions can be formed on the outer peripheral surface of the movable base 106.

According to the aforementioned rotation mechanism 105A, when the movable base 106 is moved downward, the guiding protrusions 124 are guided in the guide grooves 125 so that the guiding protrusions 124 are moved along the guide grooves 125. As a result, the angular position of the movable base 106 can be accurately determined as a function of the vertical position of the movable base 106. Although the structure of this rotation mechanism 105A is very simple, the die-cut gear-shaped sheet 111 can have an accurate helical gear shape since the angular position of the movable base 106 can be accurately determined as a function of the vertical position of the movable base 106. The reason for the simple structure is that the rotation mechanism 105A requires neither actuators for rotating the movable base such as electric motor and cylinder, nor a control mechanism for controlling the actuators. However, the rotation mechanism in the present invention is not limited to the aforementioned structure. Needless to say, the rotation mechanism may have a sensor which detects the vertical position of the movable base, and an actuator such as cylinder or electric motor which rotates the movable base in accordance with the position detected by the sensor for example.

In the aforementioned cutting tool drive mechanism 105, when the cutting tool 103 is moved downward, the fiber mat 110 placed on the die-cutting surface 102 of the workpiece rest 101 is sandwiched between the workpiece rest 101 and the cutting tool 103 so that the fiber mat 110 is die-cut into the helical gear-shaped sheet 111.

FIGS. 10 to 14 show the cutting tool 103 which die-cuts the fiber mat 110 into a helical gear shape. The illustrated cutting tool 103 includes a gear-shaped cutter 103A, and cylindrical cutter 103B. The gear-shaped cutter 103A die-cuts the fiber mat 110 into the gear shape 111. The cylindrical cutter 103b is arranged on the interior side of the gear-shaped cutter 103A, and forms a through hole at the center of the gear-shaped sheet 111.

Figure 15:
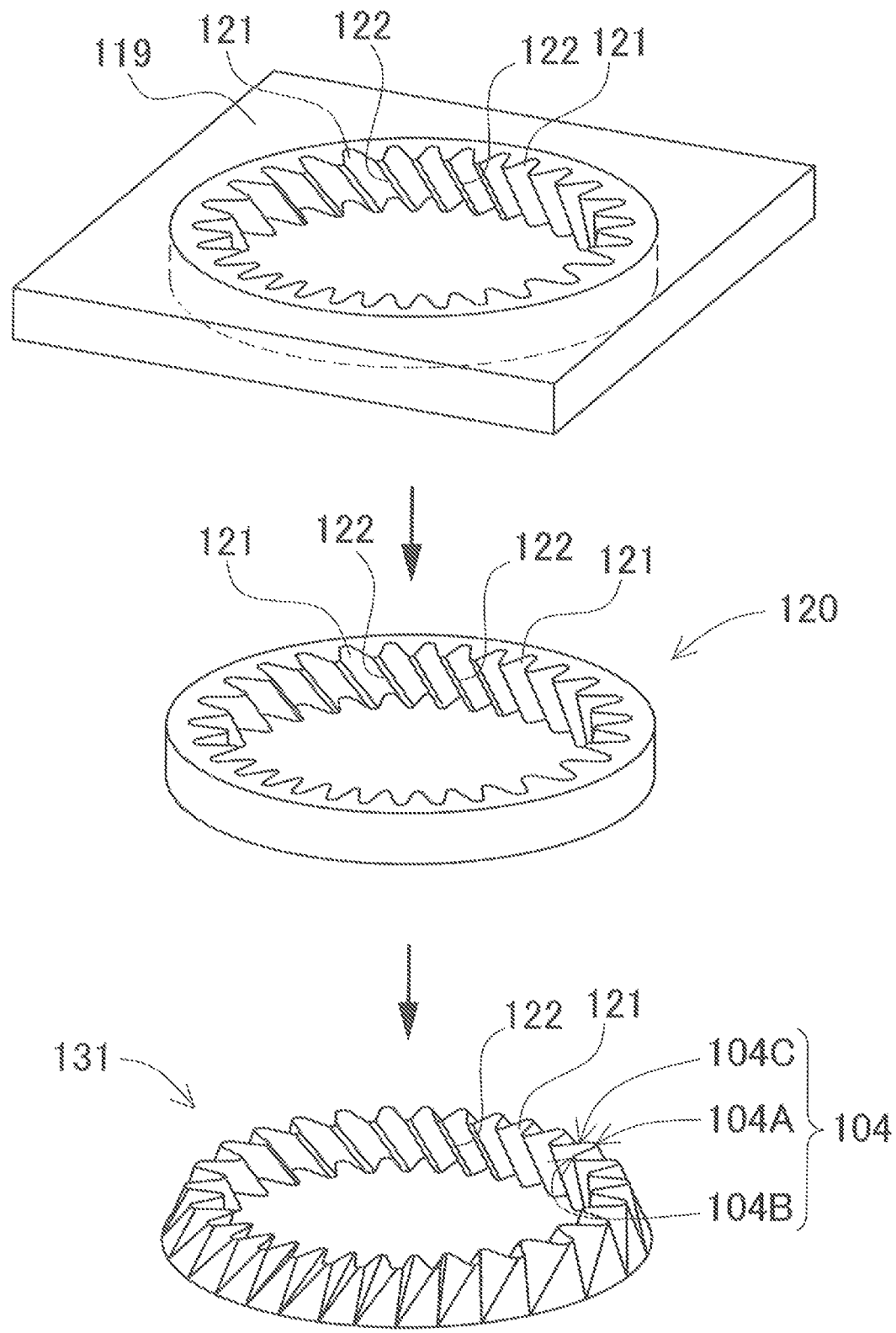
FIG. 15 is a perspective view showing processes for cutting a block of metal into a cylindrical member, and grinding the cylindrical member so as to form a gear-shaped cutter.

The illustrated gear-shaped cutter 103A is not formed of a thin metal plate which is bent into a cylindrical shape and formed into a gear shape. The gear-shaped cutter 103A is formed by cutting/grinding a metal block 119 with a predetermined thickness, as shown in FIG. 15. After that, the gear-shaped cutter 103A is hardened. The metal block 119 to be cut/ground is formed of steel, and has a circular cylinder, cylindrical shape or thick plate shape. The metal block 119 is cut/ground as a cut/ground cutting tool member 131 in the cutting/grinding process. The cut/ground cutting tool member 131 is hardened as the hardened cutting tool member in the hardening process. The hardened cutting tool member is finish-ground in the finish-grinding process. In the cutting/grinding process, the metal block 119 is cut into a cylindrical member which has the protrusion 122 and the lengthwise groove 121 on its interior peripheral surface by electrical discharge machining, and the cut/ground cutting tool member 131 is formed by grinding the exterior peripheral surface of the cylindrical member.

The illustrated gear-shaped cutter 103A includes a cutting-edge part 103a that includes cutting edges 104 on its tip end, and a base part 103b that is integrally coupled to the base-end side of the cutting-edge part 103a. The hardness of the base part 103b is lower than the hardness of the cutting-edge part 103a of this gear-shaped cutter 103A. In this gear-shaped cutter 103A, the cutting-edge part 103a and the base part 103b are formed of metals different from each other. The metal of the base part 103b has a hardness lower than the metal of the cutting-edge part 103a. According to the cushioning effect of the base part 103b with low hardness, this gear-shaped cutter 103A can absorb the impact when a fiber mat is die-cut. Since the impact can be absorbed by the base part 103b when the fiber mat 110 is die-cut, this gear-shaped cutter 103A can smoothly die-cut the fiber mat 110. In the case where the cutting-edge part and the base part of the gear-shaped cutter are formed of the same carbon steel, when the cutting-edge part and the base part are subjected to different hardening processes, the hardness of the cutting-edge part can be set higher than the base part.

Figure 10:
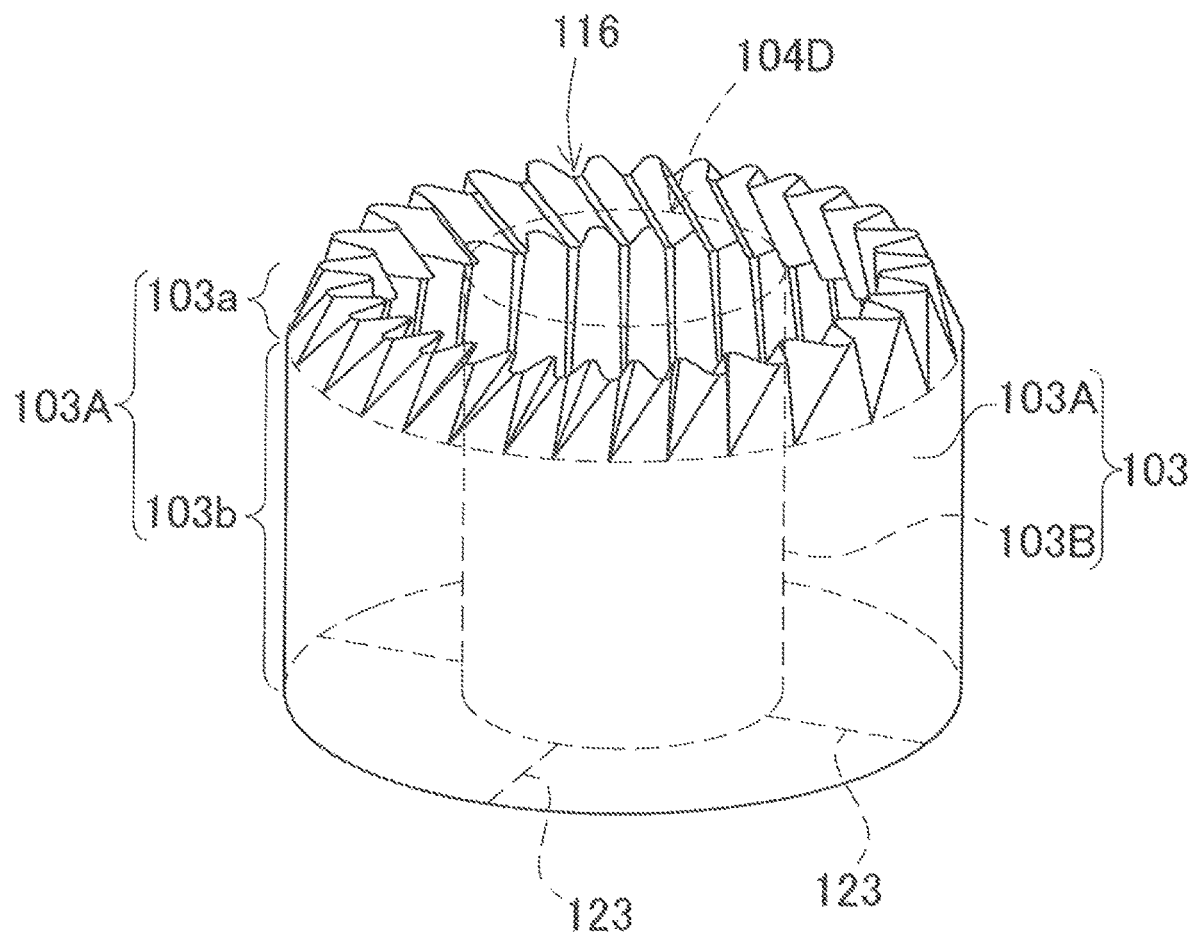
FIG. 10 is a perspective view of a cutting tool to be used for a die-cutting device according to another embodiment of the present invention.
Figure 11:
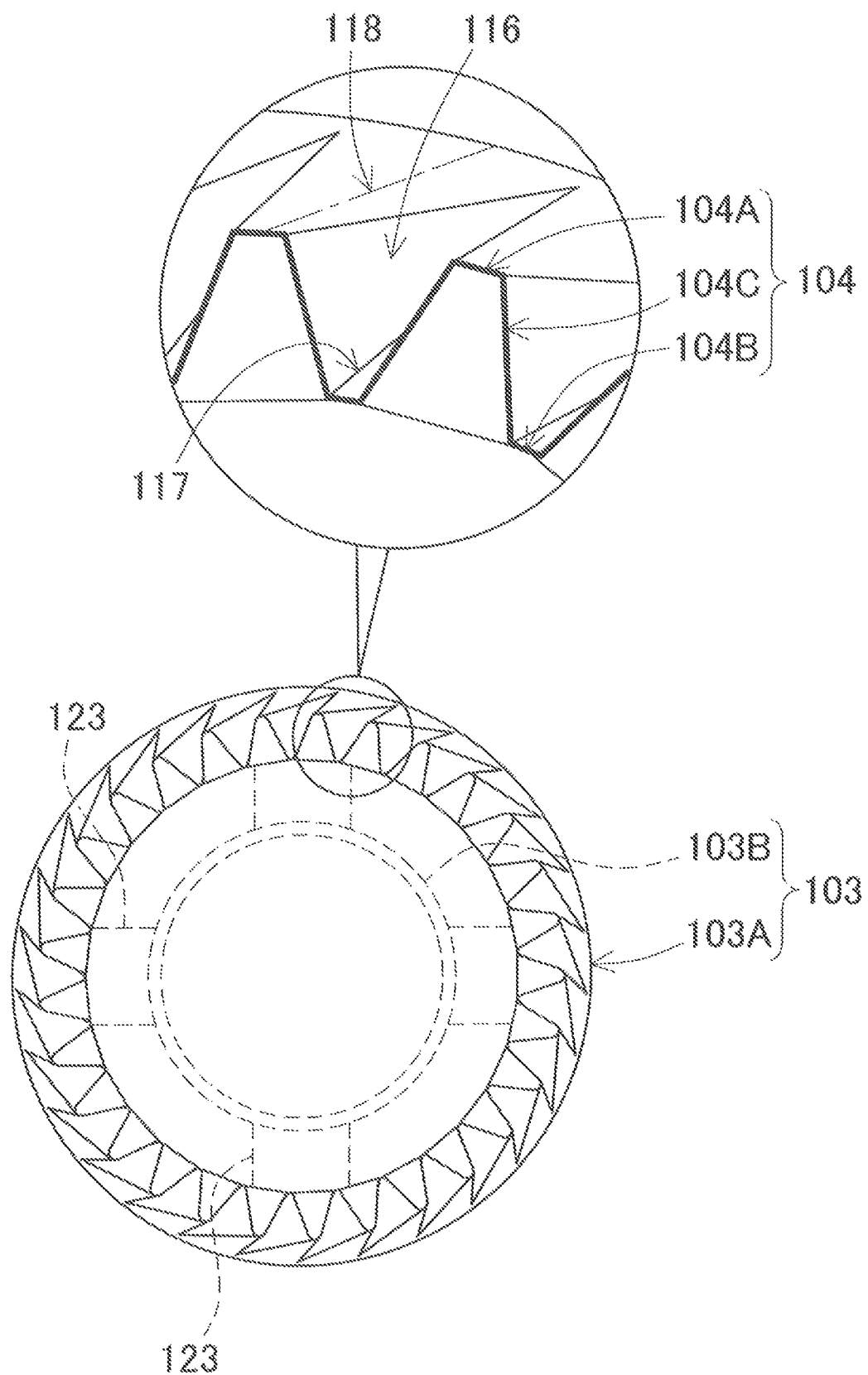
FIG. 11 is a plan view of the cutting tool shown in FIG. 10.
Figure 12:
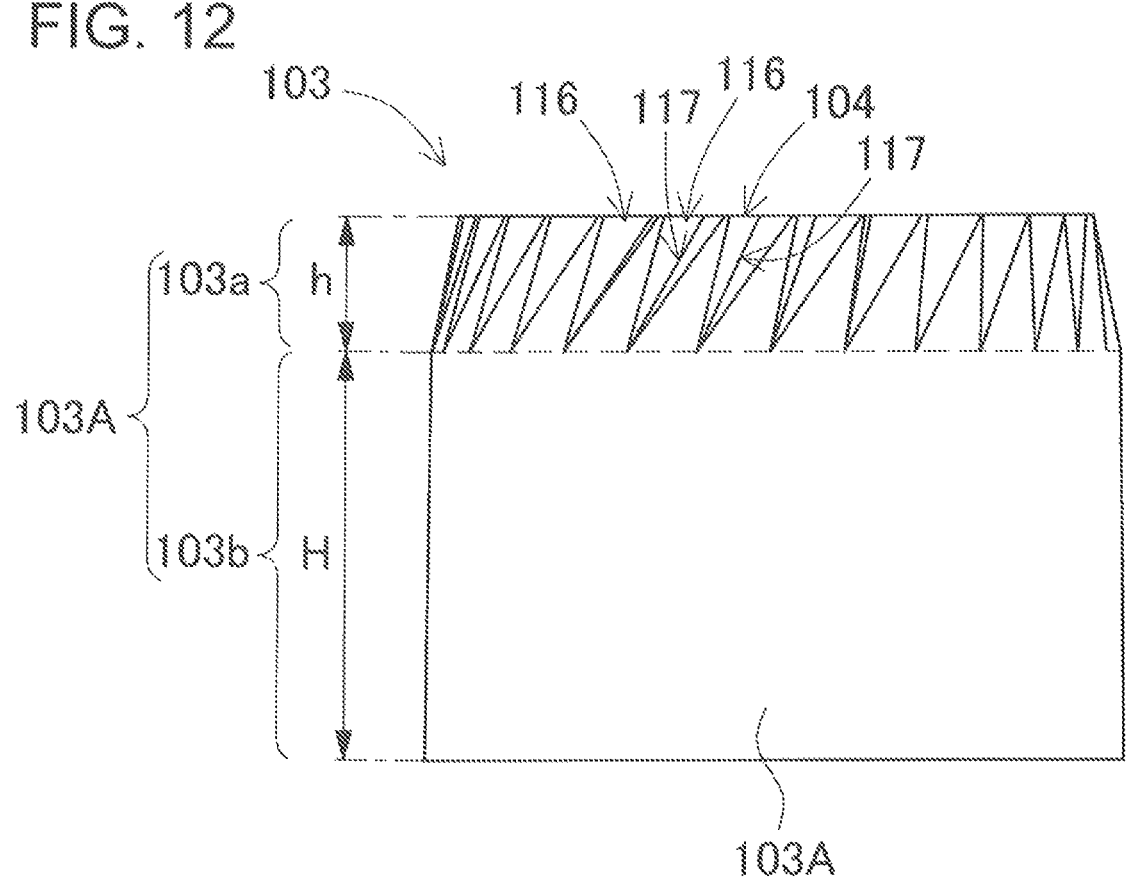
FIG. 12 is a front view of the cutting tool shown in FIG. 10.

The interior shape of the cutting-edge part 103a of the gear-shaped cutter 103A shown in FIG. 10 has an exterior helical gear shape. The size of the interior-side shape of the base part 103b is larger than the size of the interior-side shape of the cutting-edge part 103a. The gear-shaped sheet 111 can be smoothly guided to the base part 103b when a fiber mat is die cut by the gear-shaped cutter 103A. It is preferable that the height (h) of the cutting-edge part 103a of the gear-shaped cutter 103A (i.e., the axial length of the gear-shaped cutter 103A) is equal to the thickness of the gear-shaped sheet 111 to be die-cut, or greater than the thickness of the gear-shaped sheet 111. This cutting-edge part 103a can precisely die-cut the gear-shaped sheet 111 into a helical gear shape. The reason is that the gear-shaped sheet 111 can be smoothly guided to the interior of the cutting-edge part immediately after being die cut. However, the height (h) of the cutting-edge part 103a may be smaller than the thickness of the gear-shaped sheet 111. When the fiber mat 110 is die-cut into the helical-gear-shaped sheet 111, it is elastically deformed. For this reason, the gear-shaped sheet 111 can be smoothly guided into the cutting-edge part 103a and the base part 103b even if the height of the cutting-edge part 103a is smaller than the thickness of the gear-shaped sheet 111.

The height (H) of the base part 103b of the gear-shaped cutter 103A shown in FIG. 10 is greater than the height (h) of the cutting-edge part 103a. Since the base part 103b of this gear-shaped cutter 103A has a large cushioning effect, the fiber mat 110 can be smoothly die-cut into the gear-shaped sheet 111. In addition, the base part 103b can be easily attached to the movable base 106 by coupling the base part 103b to the movable base 106. Also, since the size of the interior-side shape of the base part 103b is larger than the cutting-edge part 103a, the die-cut gear-shaped sheet 111 can be guided into the base part 103b without being deformed or with being slightly deformed. For this reason, a plurality of die-cut gear-shaped sheets 111 can be smoothly guided into and removed from the base part 103b. As a result, the fiber mat 110 can be efficiently die-cut.

The cutting-edge part 103a and the base part 103b of the gear-shaped cutter 103A shown in FIG. 10 are integrally coupled to each other by welding. In the case where the gear-shaped cutter 103A is constructed of the cutting-edge part 103a and the base part 103b integrally coupled to each other, the cut/ground cutting tool member that is not hardened and the base part that is not hardened are integrally coupled to each other. Subsequently, they are hardened, and finish-ground. Thus, the gear-shaped cutter 103A is produced. Carbon steel that is excellent in workability is suitable as steel to be formed into the cutting-edge part 103a and the base part 103b. The content of carbon of carbon steel is adjusted to an optimal value in consideration of the hardness and brittleness required for the cutting-edge part 103a and the base part 103b. The hardness of the gear-shaped cutter 103A can be increased by increasing the content of carbon. However, the gear-shaped cutter will become brittle if the content of carbon is too much. For example, the content of carbon of steel to be formed into the cutting-edge part 103a is not smaller than 0.4% and not greater than 1.4%, preferably not smaller than 0.45% and not greater than 0.7%. The base part 103b is formed of a carbon steel plate with a carbon content smaller than the cutting-edge part 103a, For example, the carbon content of steel to be used for the base part 103b falls within the range not smaller than 0.3% and not greater than 1%, and preferably not smaller than 0.4% and not greater than 0.6%. However, the cutting-edge part and the base part may be formed of steel materials having the same carbon content. In this specification, the carbon content of steel is expressed in percent-by-mass.

After a steel material is formed into a cylindrical member by electrical discharge machining in the cutting/grinding process, the cutting edges 104 for a helical gear is formed on the tip end of the cutting-edge part 103a by grinding the tip end of the cutting-edge part 103a with a grinding stone or file. Thus, the cut/ground cutting tool member 131 is produced. The cut/ground cutting tool member 131 is integrally coupled to the base part 103b, and is then hardened as a hardened cutting tool member in the hardening process. Subsequently, the hardened cutting tool member is finish-ground. Thus, the cutting tool is produced. The base part 103b can be formed by bending a carbon steel plate into a cylindrical member and cutting/grinding the interior surface of the cylindrical member, or by grinding a cylindrical member of carbon steel.

FIG. 15 shows processes for producing the gear-shaped cutter 103A. It is noted that the processes shown in FIG. 5 produce the cutting-edge part 103a of the gear-shaped cutter 103A including the cutting-edge part 103a and the base part 103b which are formed of different steel materials and are integrally coupled to each other. The cutting-edge part 103a which is formed by these processes is integrally coupled to the base part 103b so that the cutting-edge part 103a and the base part 103b compose the gear-shaped cutter 103A.

Although not illustrated, the gear-shaped cutter can be formed from a single block of metal by cutting/grinding the metal block. In this case, the gear-shaped cutter can be formed into the shape shown in FIG. 10 by cutting/grinding the interior and external surfaces of the metal block.

(Cutting/Grinding Process)

The cutting/grinding process includes a process for cutting the interior surface, and process for grinding the external surface of the cylindrical member having the interior surface which is cut in the cutting process.

(Cutting Process)

In the cutting process, the metal block 119 is formed into a cylindrical member 120 with a predetermined thickness by electrical discharge machining. In the electrical discharge machining, wire (not shown) passes through the metal block 119, and an electric spark is emitted between the wire and the metal block 119 so that the metal block 119 is cut into the cylindrical member. More specifically, in the electrical discharge machining, the wire is moved relative to the metal block 119 so that the cylindrical member 120 is separated from the metal block 119. The cylindrical member 120, which is separated from the metal block 119 by electrical discharge machining, includes lengthwise grooves 121 and protrusions 122 which are inclined with respect to the center axis of the cylindrical member 120 and extend parallel to each other on the interior surface. The lengthwise grooves 121 and protrusions 122 are alternately arranged. The shape of the interior surface of the cylindrical member 120 which includes the lengthwise grooves 121 and the protrusions 122 on its interior surface corresponds to the exterior shape of a helical gear. The lengthwise grooves 121 and the protrusions 122 are inclined with respect to the center axis of the cylindrical member 120. The inclination angle of the lengthwise grooves 121 and the protrusions 122 is equal to the inclination angle of the gear teeth which are arranged on in the outer peripheral surface of the helical gear with respect to the rotation axis.

The external surface of the cylindrical member 120 which is separated from the metal block 119 of steel by electrical discharge machining corresponds to a circular cylinder. The cylindrical member 120 which has the cylindrical external surface and the helical-gear-shaped interior surface can be easily formed from the metal block 119 by electrical discharge machining. The reason is that both the interior and external surfaces of the cylindrical member 120 can be cut by moving the electrical discharge machining wire relative to the metal block 119. The interior surface of the cylindrical member 120 is formed into a helical gear shape by electrical discharge machining. Alternatively, although not illustrated, the interior surface shape of the cylindrical member 120 can be increased from the tip end to toward the base end of the cylindrical member 120. The exterior surface of the cylindrical member 120 is tapered by electrical discharge machining so that the exterior surface shape increases from the tip end toward the base end. Alternatively, the size and shape of the exterior surface of the cylindrical member 120 can be fixed from the tip end to the rear base. In the case where a circular cylinder or cylindrical metal block is used to form the cylindrical member, if the outer diameter of the cylindrical metal block is equal to the cylindrical member, only the interior shape of the cylindrical member can be formed by electrical discharge machining.

(Grinding Process)

In this grinding process, in the case where the cylindrical member 120 has a cylindrical exterior surface, the exterior-side surface is tapered by grinding so that the outer diameter of the cylindrical member 120 increases from the tip end toward the base end. In the case where the exterior surface of the cylindrical member is tapered in the electrical discharge machining, it is possible to omit the process for forming the tapered exterior surface by grinding. In addition, cutting edges 104A are formed on the tip end of the cylindrical member 120 by grinding the exterior-side surface of the tip end of the cylindrical member 120 in this grinding process. Thus, the cut/ground cutting tool member 131 is produced which have the cutting edges 104A.

The cutting edges 104 of the cutting tool 131 die-cuts the fiber mat 110 into a helical gear shape. The cutting edges 104 is constructed of the tooth-top cutting edges 104A, the tooth-surface cutting edges 104C, and the tooth-bottom cutting edges 104B which are connected to each other. The tooth-top cutting edge 104A die-cuts a fiber mat into a part which serves as the top of a tooth of a helical gear. The tooth-surface cutting edge 104C die-cuts the fiber mat into a part which serves as a tooth surface of the gear. The tooth-bottom cutting edge 1046 die-cuts the fiber mat into a part which serves as the bottom of the tooth space of the gear. The cutting edges 104 which are constructed of the tooth-top cutting edges 104A, the tooth-surface cutting edges 104C and the tooth-bottom cutting edges 1046 are formed by grinding the exterior-side surface of the cylindrical member 120.

The tooth-surface cutting edges 104C and the tooth-bottom cutting edges 1046 are formed by grinding the exterior surface of tip end of the cylindrical member 120 into V-shaped grooves 116 in the grinding process. The V-shaped grooves 116 is arranged in the exterior-side parts of the cylindrical member that correspond to the protrusions 122 which are arranged on the interior surface of the cylindrical member. In other words, the V-shaped grooves 116 are arranged at the positions of the cylindrical member opposite to the protrusions 122. The protrusions 122 are inclined with respect to the center axis of the cylindrical member 120. Correspondingly, the V-shaped grooves 116 are inclined with respect to the center axis. The tooth-surface cutting edges 104C are arranged on the both-side surfaces of the V-shaped groove 116. The tooth-bottom cutting edge 104b is arranged along the bottom part of the V-shaped groove 116. In order to form the tooth-bottom cutting edge 104b along in the groove bottom of V-shaped groove 116 in the cutting edges 104, as shown in FIG. 15, the groove bottom has a predetermined radius of curvature. Alternatively, the groove bottom may have a predetermined width although not illustrated. The depth of the V-shaped groove 116 gradually decreases from the tip end toward the base end of the cylindrical member 120 so that the wedge angle of the tooth-bottom cutting edge 104b is greater than the wedge angle of the tooth-top cutting edge 104A.

Figure 14:
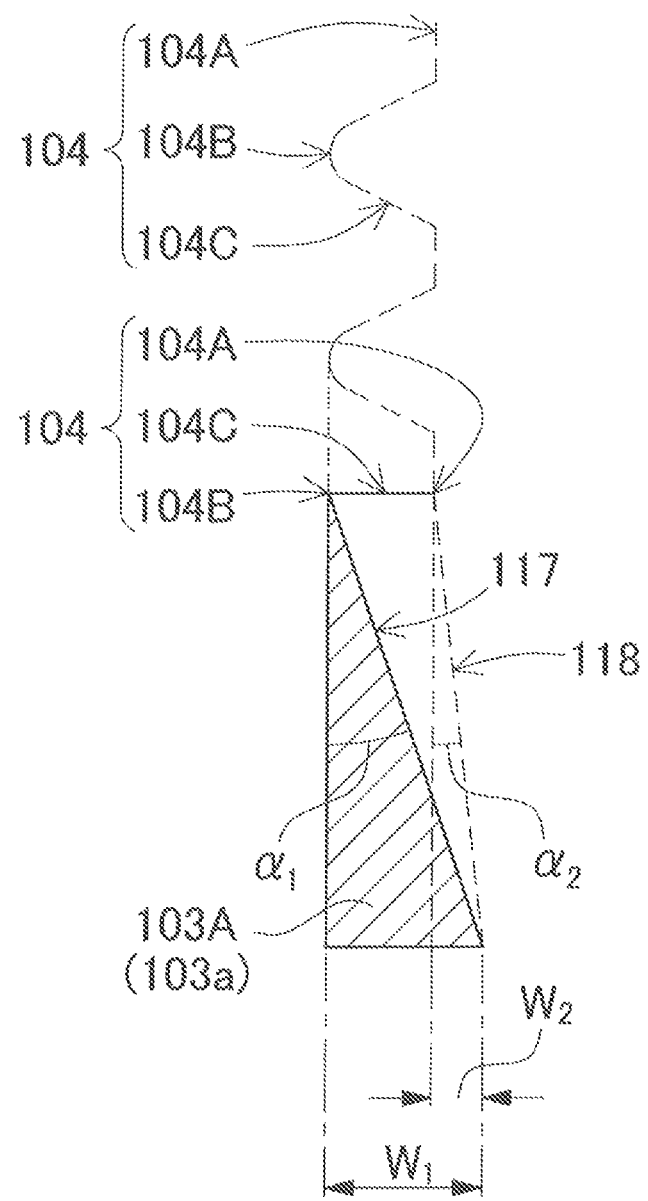
FIG. 14 is a cross-sectional view of the cutting tool shown in FIG. 10 taken along a V-shaped groove and a lengthwise groove.

FIG. 14 is a cross-sectional view of the V-shaped groove 116 taken along the longitudinal direction. FIG. 14 shows the cross-sectional shapes of the tooth-top cutting edge 104A and the tooth-bottom cutting edge 104B. In FIG. 14, the solid lines show the cross-sectional shape of the tooth-bottom cutting edge 104b taken along the longitudinal direction of the V-shaped groove 116, and the dashed lines show the sectional shape of the tooth-top cutting edge 104A taken along the longitudinal direction of the lengthwise groove 121. Since the V-shaped groove 116 becomes shallower toward the base end from the tip end, the wedge angle of the tooth-bottom cutting edge 104b is dimensioned greater than the wedge angle of the tooth-top cutting edge 104A. As shown in a front view of FIG. 12, the V-shaped grooves 116 of the gear-shaped cutter 103A shown in FIGS. 10 and 12 do not extend to the base end (the bottom side in the FIG. 12) of the cylindrical member 120. In addition to this, the tooth-bottom cutting edges 104b are arranged in parts which protrude toward the interior surface side of the cylindrical member 120. As a result, the thickness (W1) of a base end part of the cutting-edge part 103a that serves as the tooth-bottom cutting edge 104b is greater than the thickness (W2) of a base end part of the cutting-edge part 103a that serves as the tooth-top cutting edge 104A. This unique structure is very important to achieve excellent durability of the gear-shaped cutter 103A. The reason is that deformation or distortion of the tooth-bottom cutting edges 104B which protrude inward can be prevented when the fiber mat 110 is die-cut. Consequently, the durability of the gear-shaped cutter 103A can be improved.

The V-shaped groove 116 of the cutting-edge part 103a of the gear-shaped cutter 103A shown in FIGS. 10 to 14 becomes shallower toward the base end. The thickness (W1) of the base-side end of the cutting-edge part 103a which serves as the tooth-bottom cutting edge 104B is greater than the thickness (W2) of the base-side end of the cutting-edge part 103a which serves as the tooth-top cutting edge 104A. As a result, the inclined angle, that is, the wedge angle ($\alpha 1$) of the tooth-bottom line 117 from the tooth-bottom cutting edge 104B to the base end of the cutting-edge part 103a as the gear-shaped cutter 103A is greater than the wedge angle ($\alpha 2$) as the inclined angle of the tooth-top cutting edges 104A from the tooth-top cutting edges 104A to the base end of the gear-shaped cutter 103A.

Furthermore, the exterior-side surface of the tip end part of the cutting edge 104 is ground from the tip end edge in an area with a width falling the range from 1 to 5 mm so that the wedge angle gradually increases toward the tip end, and the finished angle of the tip end of the cutting edge 104 falls within the range from not smaller than 10 degrees and not greater than 60 degrees, more preferably not smaller than 15 degrees and not greater than 45 degrees. According to this, the durability can be improved. The cutting-edge part 103a is tapered by partially grinding the interior-side surface of the cylindrical member 120 so that the size of the interior-side shape of the gear-shaped cutter 103A gradually increases from the tip end toward the base end of the gear-shaped cutter 103A.

(Coupling Process between Cutting Tool and Base Part)

Before the hardening process, the base part 103b is integrally coupled to the base end of the cutting tool 131 which is formed in the grinding process and will serve as the cutting part. The base part 103b is formed by cutting/grinding the interior surface of a cylindrical member which is formed from a carbon steel plate. The size of the interior-side shape of the base part 103b is greater than the cutting-edge part 103a of this gear-shaped cutter 103A. In the case where the base part 103b is coupled to the cutting tool 131 which serves as the cutting part, the interior shape of the base part 103b is dimensioned large. In particular, the size of the interior shape of the base part 103b can gradually increase toward the base end from the tip end. The protrusions 122 of this gear-shaped cutter 103A which are arranged in the base part 103b become lower from the tip end toward the base end. According to this arrangement, since the sectional interior shape of the rear end part can be larger than the tip end, the gear-shaped sheet 111 can be smoothly guided into the base part 103b when a fiber mat is die cut, and the gear-shaped sheet 111 can be smoothly separated through the base end of the gear-shaped cutter 103A after the fiber mat is die cut.

(Hardening Process)

After the cutting tool 131 and the base part 103b that are not hardened are integrally coupled to each other, they are hardened to increase the hardness of the cutting edge 104. They are hardened similar to the process for hardening the cutting tool for a spur gear.

(Finish-Grinding Process)

Finally, the cutting edges 104 are sharpened by finish-grinding the hardened cutting part. In particular, in the finish-grinding process, the exterior-side surface of the tip part of the cutting edge 104 is finish-ground so that the finished wedge angle is adjusted to the optimum value.

Figure 13:
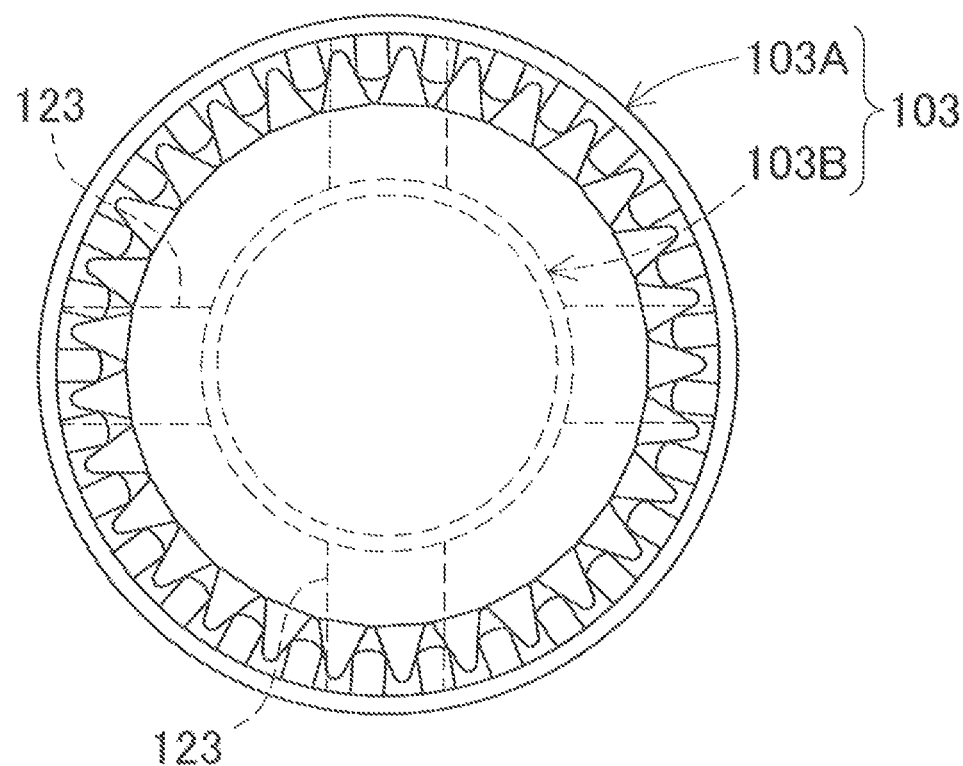
FIG. 13 is a bottom view of the cutting tool shown in FIG. 10.

The cylindrical cutter 103B is coupled to the gear-shaped cutter 103A by coupling members 123. The coupling member 123 is fastened by welding to the base ends of the cylindrical cutter 103b and the gear-shaped cutter 103A so that the cylindrical cutter 103b is arranged concentrically with the gear-shaped cutter 103A, and the sub-cutting edge 104D of the cylindrical cutter 103b and the cutting edges 104 of the gear-shaped cutter 103A lie in the same plane. The cutting tool 103 shown in FIG. 4 includes four coupling members 123 which radially extend between the cylindrical cutter 103b and the gear-shaped cutter 103A whereby coupling them to each other. One end of each of the coupling members 123 shown in FIG. 13 is fastened to the exterior side of the cylindrical cutter 103B by welding, and another end is inserted into and welded to a fit-in recessed part of the gear-shaped cutter 103A. The base end surfaces of the coupling members 123, the cylindrical cutter 103B, and the gear-shaped cutter 103A lie in the same plane. The cutting tool drive mechanism 105 presses the base end of the cutting tool 103, which includes the coupling members 123, the cylindrical cutter 103b, and the gear-shaped cutter 103A lying in the same plane, when the fiber mat 110 is die-cut.

The die-cutting device shown in FIG. 16 which includes the aforementioned cutting tool die-cuts a fiber mat to be used for a helical fiber-reinforced plastic gear into a helical gear shape in the following processes.

(Process for Placing Fiber Mat onto Workpiece Rest)

The movable base 106 is lifted up by the cylinder 107. The cutting tool 103 which is fastened to the lower surface of the movable base 106 is positioned at the raised position. In this position, the cutting tool 103 is located above the workpiece rest 101.

The fiber mat 110 is placed onto the die-cutting surface 102 of the workpiece rest 101. The elastic sheet 101A is interposed between the fiber mat 110 and the die-cutting surface 102.

(Process for Lowering Cutting Tool)

The movable base 106 is moved downward by the cylinder. The fiber mat 110 is die-cut by the cutting tool 103 which is moved downward together with the movable base 106 while rotating about the vertical axis. Since the cutting tool 103 is moved downward while rotating, the fiber mat 110 is die-cut by the cutting edge 104 into a helical gear shape. After die-cutting the fiber mat 110 into the helical gear-shaped sheet 111, the cutting edges 104 of the cutting tool 103 are engaged in the surface of the elastic sheet. As a result, the fiber mat 110 can be surely die-cut.

The cylindrical cutter 103B is fastened to the gear-shaped cutter 103A of the cutting tool 103, and arranged on the interior side of the gear-shaped cutter 103A. When the gear-shaped cutter 103A shapes the gear-shaped sheet 111 which has an exterior helical gear shape, a through hole is formed at the center of the gear-shaped sheet 111 by the cylindrical cutter 103B. Since the cutting edges 104 of the gear-shaped cutter 103A and the cylindrical cutter 103B lie in the same plane, both the gear-shaped cutter 103A and the cylindrical cutter 1036 die-cut the fiber mat 110 into the gear-shaped sheet 111. When the fiber mat 110 is die cut, the gear-shaped cutter 103A is moved downward while rotating whereby shaping the gear-shaped sheet 111 having a helical gear shape, and the cylindrical cutter 1036 is also moved downward while rotating whereby forming the through hole in the gear-shaped sheet 111. Since the edge of cylindrical cutter 1036 moves along a circle when forming the through hole in the gear-shaped sheet 111 while rotating, its cutting edge 104 moves along the circumference of the through hole. Accordingly, the through hole can be surely and properly formed at the center of the gear-shaped sheet 111.

Figure 17A:
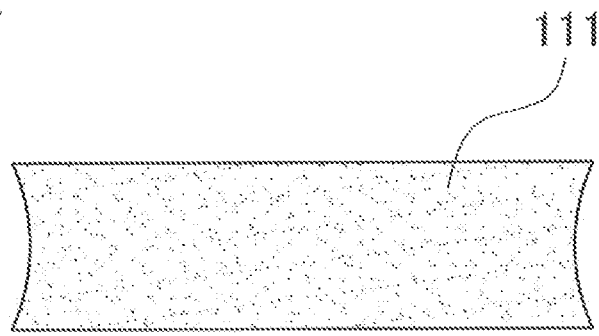
FIGS. 17A to 17B are schematic radial cross-sectional views of a gear-shaped sheet obtained by die-cutting a fiber mat.
Figure 17B:
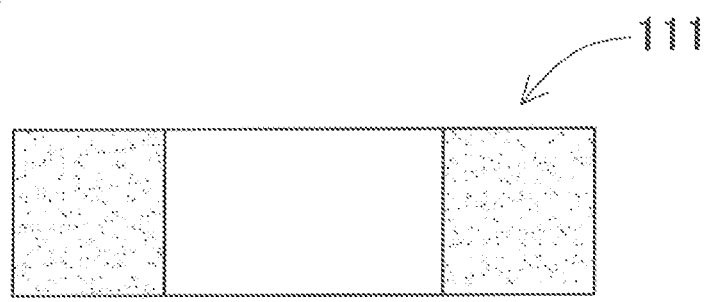
Figure 18:
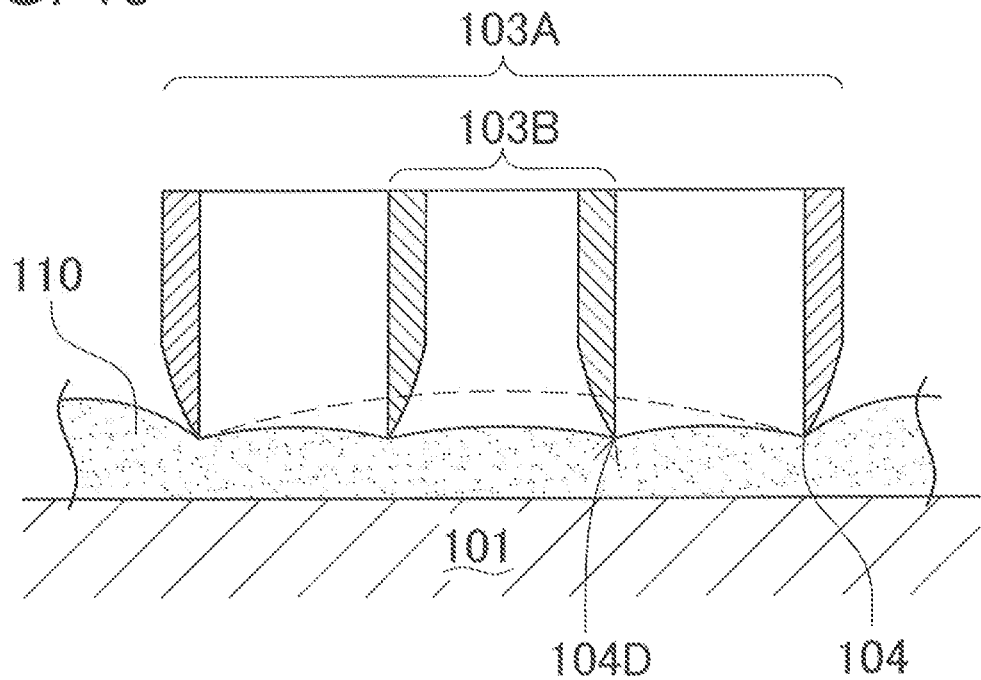
FIG. 18 is a schematic cross-sectional view of the cutting tool when a fiber mat is die-cut.

In the case where the cylindrical cutter 1036 is fastened to the gear-shaped cutter 103A of the cutting tool 103, and arranged on the interior side of the gear-shaped cutter 103A, the fiber mat 110 is simultaneously die-cut by both the gear-shaped cutter 103A and the cylindrical cutter 103B. As a result, this cutting tool 103 can precisely die-cut the gear-shaped sheet 111 having the helical gear shape. The reason is that the fiber mat 110 is die-cut into the helical gear shape which has the through hole at its center while the fiber mat 110 is sandwiched between the gear-shaped cutter 103A and the cylindrical cutter 1036. If the fiber mat 110 which can elastically deform is die-cut by the cutting tool 103 into a helical gear shape without a through hole, a recessed part is likely to appear in the central part of the outer peripheral surface of the helical gear shape formed by die-cutting as shown in FIG. 17A. The reason is that the cutting tool 103 presses the fiber mat 110 so that the upper surface of the fiber mat 110 bulges upward as shown by the dashed line in FIG. 18 when the fiber mat 110 is die-cut. Contrary to this, in the case where the cylindrical cutter 103B is fastened to the gear-shaped cutter 103A of the cutting tool 103, and arranged on the interior side of the gear-shaped cutter 103A, since both the gear-shaped cutter 103A and the cylindrical cutter 103B press the surface of the fiber mat 110 when the fiber mat 110 is die-cut out by the cutting tool 103, the height of the bulge that protrudes between the gear-shaped cutter 103A and the cylindrical cutter 103B can be small as shown by the solid lines in FIG. 18. As a result, the surface of the fiber mat 110 can be kept close to a flat surface. Consequently, the recessed parts in the central parts of the outer and inner peripheral surfaces of the helical gear shape having the through hole can be small as shown in FIG. 17B. For this reason, in this case, both the outer and inner peripheral surfaces of the gear-shaped sheet formed by die-cutting can be accurate surfaces of the helical gear shape.

(Process for Removing Die-Cut Gear-Shaped Sheet)

The gear-shaped sheet 111 which is formed by die-cutting will be held in the area between the gear-shaped cutter 103A and the cylindrical cutter 103B. The movable base 106 is moved upward by the cylinder. The cutting tool 103 is also moved upward together with the movable base 106. The gear-shaped sheet 111 which is held in the cutting tool 103 is removed from the cutting tool 103.

Fiber mats 110 can be die-cut into gear-shaped sheets 111 by repeating the aforementioned processes.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A cutting device for die-cutting a fiber mat, which can be used for a fiber-reinforced-plastic gear, comprising:
    a workpiece rest that has a die-cutting surface for holding the fiber mat to be placed on an upper surface side thereof;
    a cutting tool that can be moved toward the die-cutting surface of said workpiece rest to die-cut the fiber mat on the die-cutting surface; and
    a cutting tool drive mechanism that moves said cutting tool toward and away from the die-cutting surface,
    wherein said cutting tool includes a cylindrical gear-shaped cutter that has a tip end and a base end, and is formed of steel and has cutting edges on the tip end for die-cutting the fiber mat into a predetermined gear shape,
    wherein the cutting edges of said gear-shaped cutter lie in a plane parallel to the die-cutting surface of said workpiece rest, and include tooth-top cutting edges that can shape the addendum circle of the gear, tooth-bottom cutting edges that can shape the bottoms of the tooth spaces of the gear, and tooth-surface cutting edges that are arranged between said tooth-top cutting edges and said tooth-bottom cutting edges and can shape the tooth surfaces of the gear,
    wherein the thickness of said gear-shaped cutter gradually increases from said tooth-top cutting edges toward the base end, and
    wherein V-shaped grooves are formed on the exterior surface of the gear-shaped cutter from the tip end toward the base end of the gear-shaped cutter, and tip end edges of the V-shaped grooves serve as said tooth-bottom cutting edges and said tooth-surface cutting edges, wherein the depth of said V-shaped groove gradually decreases from the cutting edges toward the base end of the gear-shaped cutter, and a wedge angle ($\alpha 1$) of a tooth-bottom line from the tooth-bottom cutting edge to the base end of the gear-shaped cutter is greater than a wedge angle ($\alpha 2$) of the tooth-top cutting edge surface from the tooth-top cutting edges to the base end of the gear-shaped cutter, wherein the thickness of a base-side end of said tooth-bottom cutting edge (W1) is greater than the thickness of a base-side end of said tooth-top cutting edge (W2) in said gear-shaped cutter.

2. The cutting device according to claim 1, wherein the fiber-reinforced-plastic gear is a helical gear, wherein protrusions are arranged at positions of said gear-shaped cutter that are located on an interior side of said V-shaped grooves, wherein said V-shaped grooves and said protrusions are inclined at a predetermined angle with respect to the center axis of the gear-shaped cutter, wherein said cutting tool drive mechanism includes a rotation mechanism that can rotate said cutting tool about the center axis of said cutting tool as a rotation axis when said fiber mat is die-cut on said workpiece rest, wherein said fiber mat is die-cut on said workpiece rest while said cutting tool drive mechanism rotates said cutting tool.

3. The cutting device according to claim 2, wherein the fiber-reinforced-plastic gear is a helical gear, and wherein said gear-shaped cutter includes:
a cutting-edge part that includes said cutting edges on a tip end edge thereof; and
a base part that is integrally coupled to the base-end side of said cutting-edge part,
wherein said base part has a lower hardness than the cutting-edge part.

4. The cutting device according to claim 3, wherein the fiber-reinforced-plastic gear is a helical gear, wherein said cutting-edge part and said base part are formed of steel materials that are different from each other, and wherein said cutting-edge part and said base part are coupled to each other by welding.

5. The cutting device according to claim 2, wherein the fiber-reinforced-plastic gear is a helical gear, wherein said cutting tool includes a second cylindrical cutter which is arranged on an interior side of said gear-shaped cutter, and can form a through hole in a gear-shaped mat, wherein said second cylindrical cutter includes sub-cutting edge on a tip end thereof, and wherein said sub-cutting edge lies in the same plane as cutting edges that are arranged on the tip end of said gear-shaped cutter, and said second cylindrical cutter is fastened to said gear-shaped cutter.

6. The cutting device according to claim 1, wherein lengthwise grooves and protrusions extend in a movement direction of the gear-shaped cutter and are alternately arranged on an interior surface of the gear-shaped cutter, wherein said tooth-top cutting edge is arranged on a tip end of said lengthwise groove, wherein the tooth-surface cutting edge is arranged between said lengthwise groove and said protrusions, and wherein the tooth-bottom cutting edge is arranged on a tip end of said protrusion.

7. The cutting device according to claim 6, wherein the height of said protrusions of said gear-shaped cutter gradually decreases from the cutting edges toward the base end of the gear-shaped cutter.

8. The cutting device according to claim 1, wherein said cutting tool includes a metal base portion formed of a metal that is fastened to the base end of said gear-shaped cutter and has a lower hardness than said gear-shaped cutter, wherein said metal base portion is coupled to said cutting tool drive mechanism thereby coupling said gear-shaped cutter to said cutting tool drive mechanism.

9. The cutting device according to claim 8, wherein said metal base portion has a cylindrical shape and can guide a gear-shaped sheet along an interior surface of the metal base portion.

10. The cutting device according to claim 1, wherein the size of a part of or the entirety of an interior-side shape of said gear-shaped cutter gradually increases from the cutting edges toward said base end of the gear-shaped cutter.

11. The cutting device according to claim 1, wherein said cutting tool includes a second cylindrical cutter that is arranged on an interior side of gear-shaped cutter, and can form a through hole in a gear-shaped sheet, wherein said cylindrical cutter includes a sub-cutting edge on a tip end thereof, and wherein said sub-cutting edge and said cutting edges lie in the same plane.

* * * * *